United States Patent
Chapdelaine et al.

[11] Patent Number: 6,157,024
[45] Date of Patent: Dec. 5, 2000

[54] METHOD AND APPARATUS FOR IMPROVING THE PERFORMANCE OF AN APERTURE MONITORING SYSTEM

[75] Inventors: Eugene R. Chapdelaine, Bedford, N.H.; Christopher J. O'Connor, Northville, Mich.; Robert J. Burger, Newton; Stephen A. Hawley, Bedford, both of Mass.

[73] Assignee: Prospects, Corp., Novi, Mich.

[21] Appl. No.: 09/325,115

[22] Filed: Jun. 3, 1999

[51] Int. Cl.[7] .................. G01V 9/04; H02P 1/22
[52] U.S. Cl. ............. 250/221; 340/545.2; 318/264
[58] Field of Search .................. 250/221, 222.1; 340/555–557, 565, 541, 545.2, 545.3, 545.7, 545.1; 318/264–266, 466, 565; 180/167

[56] References Cited

U.S. PATENT DOCUMENTS

| | | | |
|---|---|---|---|
| Re. 33,668 | 8/1991 | Gray | 250/221 |
| 3,337,992 | 8/1967 | Tolson | 49/29 |
| 3,627,082 | 12/1971 | Berkovitz | 187/52 |
| 4,028,690 | 6/1977 | Buckley et al. | 340/258 B |
| 4,107,941 | 8/1978 | Hamilton et al. | 62/186 |
| 4,139,801 | 2/1979 | Linares | 315/83 |
| 4,220,900 | 9/1980 | Mintz | 318/266 |
| 4,236,594 | 12/1980 | Ramsperger | 180/167 |
| 4,266,124 | 5/1981 | Weber | 250/221 |
| 4,274,226 | 6/1981 | Evans | 49/25 |
| 4,452,009 | 6/1984 | Baumeler et al. | 49/25 |
| 4,458,446 | 7/1984 | Mochida et al. | 49/28 |
| 4,481,450 | 11/1984 | Watanabe et al. | 318/444 |
| 4,621,452 | 11/1986 | Deeg | 49/28 |
| 4,733,081 | 3/1988 | Mizukami | 250/341 |
| 4,736,097 | 4/1988 | Philipp | 250/221 |
| 4,766,421 | 8/1988 | Beggs et al. | 340/904 |
| 4,818,866 | 4/1989 | Weber | 250/221 |
| 4,823,010 | 4/1989 | Kornbrekke et al. | 250/341 |
| 4,866,881 | 9/1989 | Morrow et al. | 49/25 |
| 4,870,333 | 9/1989 | Itah et al. | 318/286 |
| 4,894,952 | 1/1990 | Trett et al. | 49/25 |
| 4,912,748 | 3/1990 | Horii et al. | 250/221 |
| 4,924,166 | 5/1990 | Roussel | 318/608 |
| 4,926,170 | 5/1990 | Beggs et al. | 340/904 |
| 4,942,385 | 7/1990 | Kobayashi et al. | 340/556 |
| 4,943,757 | 7/1990 | Richter et al. | 318/468 |
| 4,967,083 | 10/1990 | Kornbrekke et al. | 250/341 |
| 4,973,837 | 11/1990 | Bradbeer | 250/221 |
| 4,990,783 | 2/1991 | Muller et al. | 250/353 |
| 5,053,592 | 10/1991 | Zuercher | 200/553 |
| 5,054,686 | 10/1991 | Chuang | 236/49.3 |
| 5,059,877 | 10/1991 | Teder | 318/444 |
| 5,069,000 | 12/1991 | Zuckerman | 49/28 |
| 5,074,073 | 12/1991 | Zwebner | 49/26 |

(List continued on next page.)

FOREIGN PATENT DOCUMENTS

| | | |
|---|---|---|
| 2821681 | 11/1979 | Germany . |
| 4007271 | 9/1991 | Germany . |
| 4030607 | 4/1992 | Germany . |
| 9302676 | 5/1993 | Germany . |
| 4226134 | 2/1994 | Germany . |
| 89/08952 | 9/1989 | WIPO . |
| 94/08120 | 4/1994 | WIPO . |

*Primary Examiner*—Stephone B. Allen
*Attorney, Agent, or Firm*—Weingarten, Schurgin, Gagnebin & Hayes LLP

[57] ABSTRACT

A monitoring system for use in detecting the presence of an obstacle in or proximate to an aperture. Materials are applied to one or more reflecting surfaces adjacent the aperture, enabling the improvement of the signal-to-noise ratio in the system without requiring tuning the system for the particular environment. The choice of specific material depends upon the type of radiation used for aperture monitoring and whether an obstacle is detected as an increase or decrease in reflected radiation. A calibration LED within the monitoring system enables predictable performance over a range of temperatures. The monitoring system is also provided with the capacity to adjust to variations in the background-reflected radiation, either automatically by monitoring trends in system performance or by external command. The latter case includes the use of a further element for communicating to the monitoring system directly or indirectly.

73 Claims, 9 Drawing Sheets

U.S. PATENT DOCUMENTS

| | | | |
|---|---|---|---|
| 5,081,586 | 1/1992 | Barthel et al. | 364/424.05 |
| 5,122,796 | 6/1992 | Beggs et al. | 340/904 |
| 5,134,292 | 7/1992 | Segawa et al. | 250/342 |
| 5,142,152 | 8/1992 | Boiucaner | 250/341 |
| 5,149,921 | 9/1992 | Picado | 187/130 |
| 5,191,268 | 3/1993 | Duhame | 318/266 |
| 5,210,406 | 5/1993 | Beran et al. | 250/221 |
| 5,245,177 | 9/1993 | Schiller | 250/221 |
| 5,326,967 | 7/1994 | Hermann et al. | 250/221 |
| 5,334,876 | 8/1994 | Washeleski et al. | 307/10 |
| 5,335,186 | 8/1994 | Tarrant | 364/550 |
| 5,399,950 | 3/1995 | Lu et al. | 318/565 |
| 5,418,359 | 5/1995 | Juds et al. | 250/221 |
| 5,424,711 | 6/1995 | Muller et al. | 340/426 |
| 5,506,567 | 4/1996 | Bichlmaier et al. | 340/555 |
| 5,539,290 | 7/1996 | Lu et al. | 318/565 |
| 5,995,854 | 9/1999 | Zhang et al. | 318/480 |

METHOD AND APPARATUS FOR IMPROVING THE PERFORMANCE OF AN APERTURE MONITORING SYSTEM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Closures for apertures such as vehicle windows, sunroofs and sliding doors are now commonly motor driven. As a further convenience to an operator or passenger of a vehicle, such power windows are frequently provided with control features for the automatic closing and opening of an aperture following a simple, short command from the operator or passenger. For instance, a driver's side window may be commanded to rise from any lowered position to a completely closed position simply by momentarily elevating a portion of a window control switch, then releasing the switch. This is sometimes referred to as an "express close" feature. This feature is commonly provided in conjunction with vehicle sunroofs. Auto manufacturers may also provide these features in conjunction with power doors, hatches or the like. Such automated aperture closing features may also be utilized in various other home or industrial settings.

Other convenience features now being offered for use on vehicles include environmental venting modes, in which vehicle windows are automatically lowered or opened a prescribed distance once a control system determines a certain temperature threshold, internal or external, has been met or exceeded. In addition, a precipitation detection system may be provided for sensing the advent of precipitation and for automatically closing a sunroof, windows or an automatic door. These specific examples pertain to vehicles, though other instances of automatic aperture adjustment are known to one skilled in the art.

In addition to providing added convenience, however, such features introduce a previously unencountered safety hazard. Body parts or inanimate objects may be present within an aperture when a command is given to automatically close the aperture. For example, an automatic window closing feature may be activated due to rain while a pet in the vehicle has its head outside a window. A further example includes a child who has placed its head through a window or sunroof and then itself accidentally initiates an express close operation.

In order to avoid tragic and damaging accidents involving obstacles entrapped by a power window, some vehicles are now provided with systems which detect a condition where a window has been commanded to express close, but which has not after a given period of time. As an example, a system may monitor the time it takes for a window to reach a closed state. If a temporal threshold is exceeded, the window is automatically lowered. Another system monitors the current drain attributed to the motor driving the window. If it exceeds a threshold at an inappropriate time during the closing operation, the window is again lowered.

The problem with such safety systems is that an obstacle must first be entrapped and subject to the closing force of the window or other closure for a discrete period of time before the safety mechanism lowers the window. Limbs may be bruised and fragile objects may be broken by such systems. In addition, if a mechanical failure in the window driving system occurs or if a fuse is blown, the obstacle may remain entrapped.

To address these shortcomings, a system has been proposed which monitors the environment adjacent to or within an aperture, and which may be used as an obstacle detection system, among other applications. This system may be used in conjunction with a power window to prevent activation of an express close mode, to stop such a mode once in progress, or to exit an express close mode and automatically reverse the window motion. The system comprises an emitter positioned in proximity to the aperture to emit a field of radiation adjacent the aperture. A detector is also provided which normally receives radiation reflected from one or more surfaces proximate the aperture. When an obstacle enters the radiation field, it alters the amount of reflected radiation received at the detector. This alteration, if sufficient to meet or exceed a threshold value, can be used to prevent, stop or reverse an express close mode, to activate a warning annunciator, or to initiate some other action.

The economics of producing such a system dictate that it is not feasible to produce a system custom-tailored for the environment of every vehicle in which it is installed. This is also true if the system is installed for some other non-vehicle application. Therefore, depending upon the reflecting characteristics of the environment proximate the aperture, the system detector will provide varying degrees of sensitivity. In one embodiment where the detector registers a high degree of reflectivity from the environment and is triggered by an obstacle which decreases the reflected radiation, it is desirable that the environmental reflectance be maximized. In contrast, in an embodiment where the detector senses a minimum of reflected radiation normally and is triggered by a higher degree of reflectance from an obstacle, it is desired to minimize environmentally reflected radiation. In vehicle applications, radiation reflectance is likely to vary between vehicle manufacturers, between vehicle models and model years, and between individual vehicles, due to the physical orientation of surfaces adjacent an aperture and the materials comprising such surfaces.

Another issue to be addressed with known monitoring systems includes the need to calibrate the various system components, including the reaction of the components to temperature variations. For instance, if the emitter of the monitoring system is comprised of one or more light emitting diodes (LEDs), and the detector is comprised of a photo IC which provides an output pulse which increases in length with increased detected radiation, it is necessary to know in advance what level of receiver gain is necessary to achieve a desired output pulse length for a given LED output.

Further, both the LEDs and a receiver photo IC have a non-trivial response to temperature fluctuations. LED output tends to decrease significantly with increasing temperature, and photo IC responsiveness tends to increase with temperature. Without adequate compensation, these factors render the monitoring system useless in typical vehicle applications.

Additionally, reflecting surfaces adjacent the aperture tend to alter over time. For vehicles, such alteration may be across manufacturers, models, model years and individual vehicles. Thus, a monitoring system initially optimized for a particular environment may not be optimized for the useful life of the system. In the worst case, environmental changes are sufficient to cause reflected energy to register in the system as an obstacle when no obstacle is present.

BRIEF SUMMARY OF THE INVENTION

In order to address the need to maximize the signal-to-noise ratio of an aperture monitoring system, materials are applied to one or more reflecting surfaces adjacent the aperture. For vehicle aperture applications, the provision of such materials enables the improvement of the detector signal-to-noise ratio (SNR) without requiring the fine-tuning of such detector systems for each manufacturer, for each model, or for each individual vehicle.

The choice of specific material depends upon a variety of considerations, the first of which is the type of radiation used for aperture monitoring. Infrared (IR) radiation allows optical wavelength filters that eliminate most of the visible background radiation, and does not interfere with a vehicle operator's vision at night. For monitoring systems which employ IR radiation, two further options are available. The receiver may be configured to detect a high degree of background reflectance, such that an object within or adjacent the aperture decreases the reflected energy. Alternatively, the receiver detects a minimized amount of reflected energy, and relies upon an increase in reflectance from an obstacle for detection.

Ultrasonic transducers may be used in an alternative system, though such systems typically suffer from several drawbacks. Ultrasonic transmitters typically require high voltage, a particular drawback in vehicle installations. Further, the detection of an obstacle in an ultrasonic system requires the ability to differentiate, in time, between a signal or pulse which is reflected from a background surface, and one which is reflected sooner, from an obstacle. In a vehicular application, the time difference between the two pulses is on the order of 1 mS or less, which is difficult to detect reliably and economically with present day technology. However, for other large-scale applications, the ability to make such differentiations may be more easily provided.

A further option for a detector system is based upon visible light. The principle drawback in optical systems involves the likelihood of distracting a vehicle operator at night when light is emitted for obstacle detection. Sunlight or other light sources may also interfere with the proper operation of a visible light-based obstacle detection system. Once again, alternative uses for such a monitoring system, such as within an industrial processing environment, may allow the use of a visible light-based system.

As previously described, one detector embodiment expects a high degree of background reflection, and registers an obstacle based upon a decrease in reflected energy due to an obstacle blocking the background-reflected energy. Conversely, another detector embodiment expects a small amount of background-reflected energy under normal circumstances, and can sense a greater amount of reflected energy from an obstacle. In the first case, a material is chosen to improve the SNR of the system by increasing the amount of radiation reflected to the detector, while in the second instance, the material is chosen to absorb radiation from the emitter. However, it may not always be necessary to augment the appropriate energy reflectance characteristics of the surfaces adjacent an aperture.

In one embodiment, the aperture monitoring system is comprised of one or more radiation plane light emitting diodes (LEDs), a photo IC including a photodiode for detecting reflected radiation and a receiver in communication with a controller. The greater the energy level of the detected radiation, the longer the pulse length of the output of the photo IC. A threshold is established in order to define whether a particular photo IC pulse length is within a range of normal pulse lengths. However, LED output levels vary inversely with temperature. In addition, the photo IC may have a temperature dependence, such that the photo IC becomes more sensitive with increasing temperatures. These opposite reactions can be beneficially used to at least partially offset each other.

By employing a calibration LED within the monitoring system, reliable performance can be achieved over a broad range of operating temperatures. Three initialization steps are preferably employed for this monitoring system. First, the system itself is calibrated. The calibration LED is activated and the receiver gain is varied in order to establish calibration constants between receiver gain and output pulse width for a given value of calibration LED drive current. These constants are recorded in a memory device associated with the controller. As an aside, wherever drive current is recited in conjunction with the calibration LED or the radiation plane LEDs, this could alternatively be replaced with drive voltage.

Second, the monitoring system is installed in the operating environment, such as a vehicle, if not already so installed. Here, the radiation plane LEDs are driven with a drive current necessary to produce the same receiver photo IC output as produced by the calibration LED. Thus, a correlation between the drive current for the calibration LED and the drive current for the radiation plane LEDs is established.

Finally, an initialization occurs immediately prior to each activation of the monitoring system. The calibration LED is stimulated and the receiver gain is adjusted using the calibration constants derived in the first calibration step until a target output pulse length is achieved from the photo IC. Then, the appropriate drive current is supplied to the radiation plane LEDs, based upon the correlation factor as applied to the calibration LED drive current. The output pulse length from the photo IC responding to the reflected radiation plane LED emissions should be the same as that generated in response to the calibration LED radiation. However, if the photo IC output falls beyond a specified range, an obstacle may have been detected.

In order to at least partially address the temperature sensitivity of the system, a temperature sensor or monitor, such as a thermistor in one embodiment, is provided for monitoring the ambient temperature. Based upon that value, the LED drive current is adjusted, taking into consideration the decrease in LED efficiency, and the receiver gain is adjusted, taking into consideration the increase in photo IC sensitivity with increased temperature. Alternatively, a transistor having a known temperature response for Vbe and a correlation constant for the transistor at a known temperature can be used in place of a thermistor. As Vbe decreases, the LED current automatically increases for a fixed base voltage. With an appropriate choice of base resistor, the rate of change of LED current can be set to offset the change in any LED brightness that might result from ambient temperature changes. In a similar fashion, the receiver gain is adjusted using the derived temperature and the known temperature response of the receiver. In a further embodiment, the data relating to ambient temperature may be used to compensate for LED and receiver temperature sensitivity by adjusting only one of the receiver gain or LED drive current.

A further consideration in the optimization of such aperture monitoring systems involves the alteration or degradation of the aperture environment with time, or due to a redesign or rearrangement of the surfaces adjacent the aperture. Modern vehicle interior trim is typically subject to extreme temperature cycles, to extreme levels of humidity, and to wear through repeated use or abuse. Such environmental stresses result in variations over time in the nature of the radiation reflected from these background surfaces. The application of materials for the improvement of SNR at the detector of a monitoring system can be performed as the vehicle ages.

In addition to or as an alternative to the application of reflectance-altering materials, the monitoring system itself can be provided with the capacity to dynamically adjust to variations in the background-reflected radiation. This is achieved in a number of ways. First, the system detects the energy level of received radiation under certain circumstances (e.g. temperature, LED drive current) and compares the value of the photo IC output to a threshold. If the threshold is met or exceeded, an alarm condition is identified and further action, including commanding the stoppage or reversal of an express close mode or the activation of an alarm annunciator, is taken.

If the threshold is not met or exceeded, the detected energy level may be averaged with the difference between each of a selected number of previously detected energy levels and the threshold, as stored in memory associated with the monitoring system. The result of this averaging process is utilized in defining an offset for the monitoring system for future cycles. For instance, an offset can be defined for the radiation plane LEDs, or for the receiver gain. This offset can cause an adjustment in the difference between the threshold value and the receiver output by a percentage of the averaged variations. The number of samples from the previous measurements to be averaged can be varied depending upon the rate at which background-reflected radiation is expected to change as a result of predicted surface degradation, or based upon an empirical analysis by the monitoring system of the rate of change of background-reflected radiation.

In variations on these processes, the difference between the current receiver output and the threshold may be used without previous measurements in defining an appropriate offset. Alternatively, a desired number of discontinuous prior measurements is utilized in an averaging process.

Another approach to compensating for changes in the reflectance of surfaces proximate the aperture includes the use of a further element in the monitoring system which causes the presently detected background-reflected radiation to be used as the basis for calibration or recalibration of the monitoring system. This approach is useful in the case where, in a vehicle application, a piece of door trim adjacent a window has broken off, thus altering the expected reflected radiation beyond an alarm threshold. In this case, it is necessary to recalibrate the monitoring system according to the current environment. Severe environmental degradation of the vehicle interior or a collision may also warrant such a complete recalibration. The recalibration process itself is essentially the same as that used for initial calibration upon installation of the monitoring system into the aperture environment.

The initial calibration or recalibration itself may be initiated through a variety of approaches. First, some modern vehicles have one or more data networks over which various vehicle control modules communicate. One such module is referred to as an electronics control module, responsive to low-voltage signals from operator controlled switches for adjusting vehicle window positioning, among other functions. An aperture monitoring system such as presently described would be interfaced to an electronics control module, in one embodiment. Thus, a removable device such as a laptop computer having an appropriate interface element would be able to communicate through the vehicle network to the electronics control module, and thence to the monitoring system for commanding calibration according to the present aperture environment.

Alternatively, the calibrating device (i.e. the laptop computer in one embodiment) can be connected directly to the electronics control module, either by removing a connection normally made to the electronics control module and substituting the calibrating device, or by mating the calibrating device to a dedicated connection point associated with the electronics control module. Further still, the calibrating device can be interposed between the electronics control module and the monitoring system.

The calibrating device itself can take a variety of forms. As above, it can be implemented with a laptop having the appropriate interface circuitry. Alternatively, it can be a specialized piece of hardware, having detachable or fixed cabling. These embodiments are particularly useful by authorized service personnel. For vehicle applications, such hardware would most likely be utilized by dealer repair personnel.

Another embodiment for the calibrating device includes an emitter programmed to radiate a specific coded signal. Assuming the monitoring system is operable, the receiver in this embodiment would be programmed to recognize the coded signal and to recalibrate according to the existing environmental conditions. This embodiment could be utilized by either trained repair personnel or by persons without particular training, including vehicle owners. Here, the calibrating device could be a simple IR emitter radiating a predetermined pattern of pulses towards the receiver, either within or outside the vehicle.

A further embodiment of the system which includes the ability to calibrate on command is a mechanical or electrical switch associated with the monitoring system. This switch could be akin to a circuit breaker in one instance. Alternatively, the mechanical or electrical switch could be associated with the electronics control module or some other networked device capable of communicating with the monitoring system and in turn initiating the calibration of the monitoring system according to the current environmental conditions.

DETAILED DESCRIPTION OF THE INVENTION

A variety of applications exist for an aperture monitoring system. In industrial settings, an automatic door benefits from the use of a system which monitors whether the door would be obstructed if closed. Likewise, in automotive applications, an appropriately adapted monitoring system finds utility in preventing entrapment within power windows, sunroofs, doors, or other aperture closures. Typically, such monitoring systems comprise an emitter for generating an appropriately patterned radiation field adjacent or within the aperture. Surfaces close to the aperture and within the field of the radiation pattern reflect the radiation. A receiver is positioned to receive radiation which is reflected from those surfaces. Normally, without any foreign objects interjected into the radiation field, the energy level of the reflected radiation does not exceed an alarm threshold stored in a memory element in conjunction with the receiver.

However, if a foreign object such as a human or animal limb is close to or within the aperture, the reflected radiation will be altered to a degree that the reflected radiation does exceed the alarm threshold. In one embodiment, the level of reflected radiation is decreased as a result of the foreign object absorbing part of the radiation that would otherwise be reflected back to the receiver, blocking part of the reflected radiation from reaching the receiver, or both. In another embodiment, the level of reflected radiation is increased as a result of emitted radiation reflected off the foreign object and back to the receiver rather than being absorbed by the aperture environment surface(s).

Figure 1:
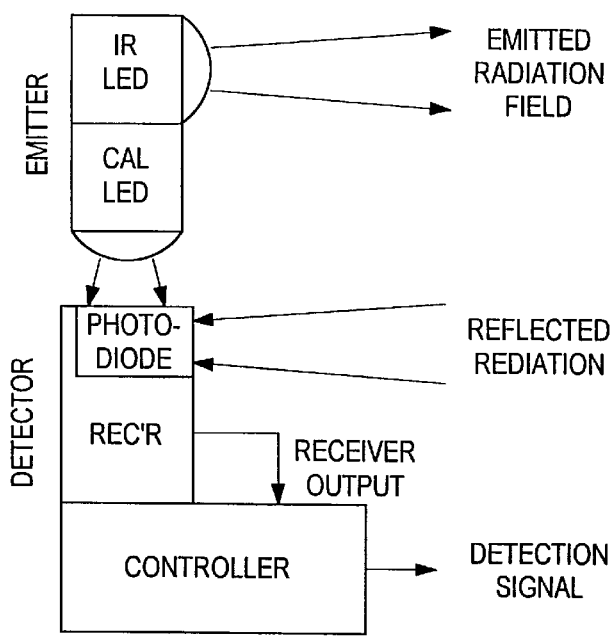
FIG. 1 is a block diagram of an aperture monitoring system according to the present disclosure.

Embodiments of such a monitoring system may include the following features, as shown in FIG. 1. A detector, comprising a receiver and a controller, may include an optical detector, an infrared detector, an ultrasound detector, or similar devices. The receiver may be either integral with or in communication with the controller, which is alternatively referred to as a processor. The receiver output is indicative of the strength of the received, reflected radiation. For example, the receiver may produce plural pulses having durations related to the intensity of the energy received by the detector. The detector may then deliver a detection signal when the duration of one pulse exceeds a predetermined value, referred to as a threshold. Alternatively, the detector may produce the detection signal when the duration of each of a predetermined number of consecutive pulses exceeds the threshold.

The threshold may be related to the duration of a pulse when no obstruction is present or the average duration of pulses produced when no obstruction is present and a closure such as a window or door moves from an open position to a closed position. The threshold may include a correction factor that accounts for variations in the duration of pulses produced when no obstruction is present, and may vary based upon the position of the closure. The threshold, or some other value indicative of an obstruction-free opening, may be stored during an initialization procedure. The threshold may be a single value, whereby an alarm condition is recognized if a pulse duration value is either above or below the threshold, depending upon the embodiment. Alternatively, the threshold may be defined by a range of acceptable values, whereby an alarm condition is recognized if the pulse duration value is only above this range, only below this range, or either above or below the range.

Alternatively, the detector may provide some other output signal representative of the received radiation strength, such as an analog signal whose voltage varies with the level of the received radiation.

The detector and emitter may be contained in an integral unit, which may be a compact unit in which the detector and the emitter share a common lens. The emitter may include a light emitting diode or a laser device.

Automatic closing or opening of the closure within the aperture may be initiated by a rain sensor, a temperature sensor, a motion sensor, a light sensor, or by manual activation of a switch. Thus, a system according to the present disclosure may be provided with a signal commanding the opening or closing of an aperture, this signal coming from one of many possible sources. However, the presently disclosed system provides the same function, regardless of the source of the control command.

In a preferred embodiment, the monitoring system of the present disclosure is activated after receipt of this commanding signal and before operation of the powered closure, though it can also be utilized to determine aperture environment status at any other time. While the present disclosure is primarily directed towards the detection of an obstacle within an aperture about to be closed, it may also be utilized to detect conditions proximate a closed aperture prior to initiating the opening of the aperture. For instance, in a system which is adapted for monitoring the environment adjacent an automatic sliding door, it may be useful to inhibit automatic opening of the door if the monitoring system detects the presence of an object lying against the inside surface of the door. It may be preferable to provide an override feature to a door control system such that a warning from a monitoring system may be overridden.

Figure 2:
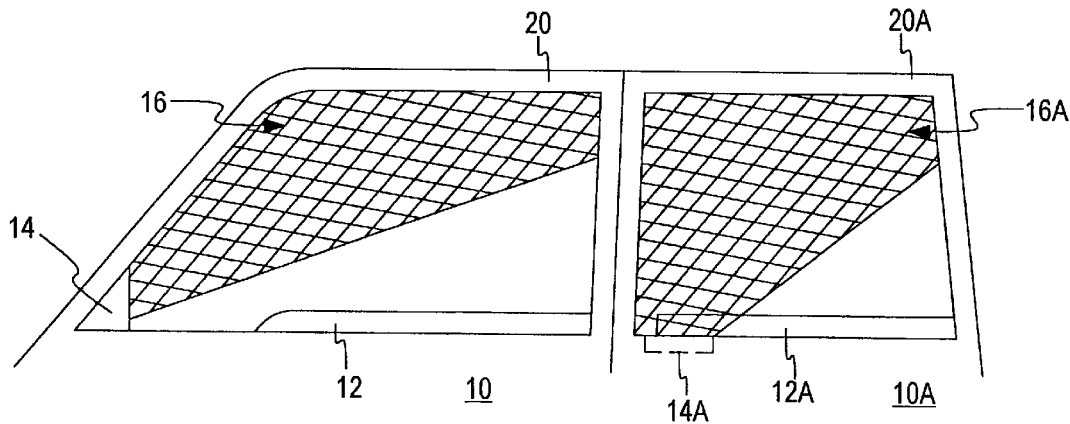
FIG. 2 is an illustration of the placement of aperture monitoring systems, such as of FIG. 1, in a vehicle for use with vehicle windows.

With respect to FIG. 2, an aperture monitoring system is illustrated in the form of a vehicle window monitoring system. This system includes a front emitter/receiver unit 14 disposed in a front door 10 and positioned to produce an energy curtain 16 in a region to be traversed by a front window. Also provided is a rear emitter/receiver unit 14A in a rear door 10A, positioned to produce a second energy curtain 16A. An opposite side of the vehicle would typically be provided with like monitoring systems for the respective windows.

The emitter/receiver units 14, 14A include emitters that produce the energy curtains 16, 16A and receivers that detect any portion of the respective energy curtain that is reflected back to the emitter/receiver units 14, 14A from the window frame 20, 20A. As noted elsewhere and depending upon the monitoring system embodiment, an obstacle interjected into the radiation field either increases or decreases this reflected portion of the radiation curtain.

The front emitter/receiver unit 14 is positioned at the lower front corner of the window aperture. This ensures that the energy curtain 16 covers a significant portion of the window aperture, a portion in which an obstruction could be caught between the window and the surrounding window frame. Likewise, the rear emitter/receiver unit 14A is positioned at the lower front corner of the window. This positioning ensures suitable coverage of the aperture by the radiation curtain 16A, and enables convenient installation within a door panel.

Figure 3:
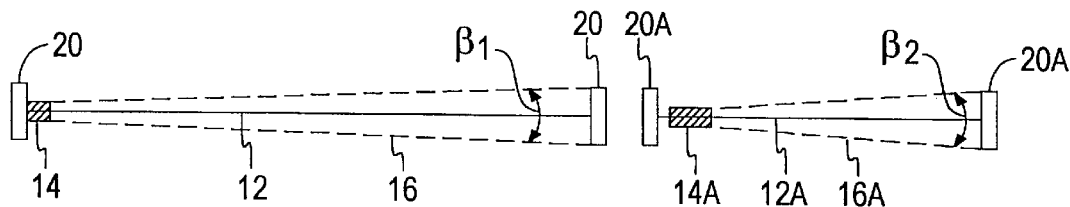
FIG. 3 is a top view of the systems of FIG. 2.

With respect to FIG. 3, the two emitter/receiver units 14, 14A are positioned so that horizontal angles $\beta_1$, $\beta_2$ of the energy curtains 16, 16A are roughly centered in the window frame 20, 20A of the door 10, 10A. This ensures that, even if an emitter/receiver unit 14, 14A is mis-aligned due to vibration, repeated door closure, or other reason, the energy curtains 16, 16A will still be capable of detecting obstructions in the planes defined by the respective windows. Installation concerns arising from aligning discrete emitter and receiver units are also addressed by packaging the emitter and receiver in the same physical package. Common packaging also minimizes the opportunity for misalignment between the emitter and receiver due to environmental vibration or shock.

The installations illustrated for the vehicle window embodiments in FIGS. 2 and 3 may be instructive in envisioning installations proximate sunroofs, power doors or other apertures having power or automatic closures. What is required is an emitter/receiver unit positioned relative to the aperture such that a radiation field is capable of being emitted adjacent or within the respective aperture, or both; a predictable radiation return is generated in the absence of a foreign object near or within the aperture.

A controller associated with the emitter/receiver unit operates the aperture monitoring system according to a prescribed series of steps, discussed in greater detail below. Typically, the controller does not activate the monitoring system until the controller has received a close request signal. Automatic close requests can be generated by the controller itself in response to input from various environmental sensors such as a rain sensor or a temperature sensor. An automatic close request can also be generated by a vehicle operator or passenger, and is typically identified by the controller as the activation of a window control switch for more than a certain time period, e.g. 3/10 second.

If the close request is an automatic close request, the controller activates the appropriate emitter, then the characteristics of the receiver output pulse are analyzed. In an embodiment where the output pulse width is varied according to the received radiation strength, the presence of an obstruction adjacent or within the aperture is reflected in a variance of the receiver output pulse widths from a predicted norm. Thus, the controller detects obstructions by comparing the output pulse width t to T', an initialization value related to the length of a detection pulse produced by the receiver when an aperture environment is free from obstructions. T' is generated in an initialization procedure during installation of the system. The emitter is activated and the detection signal is monitored while the aperture is closed under obstruction-free conditions. T, the average value of the output pulse width while the window is being closed, is determined from the detection signal. T' is thus generated as:

$$T'=T+2\sqrt{T}$$

where the square-root term allows some deviation in the value of an acceptable t and thereby accounts for deviation that could be caused by variations in system power.

The controller receives inputs from various system sensors, such as a rain sensor, temperature sensor, light sensor and the aperture monitoring system, and provides control signals to window motors, a sunroof motor, or an automatic door motor, depending upon the specific application. The controller can also interface the aperture monitoring system to an alarm unit which may produce audible or visual alarms, and which may prevent vehicle operation. The alarm unit may also transmit an alarm or beacon signal, such as an RF signal at a specified frequency.

Figure 4:
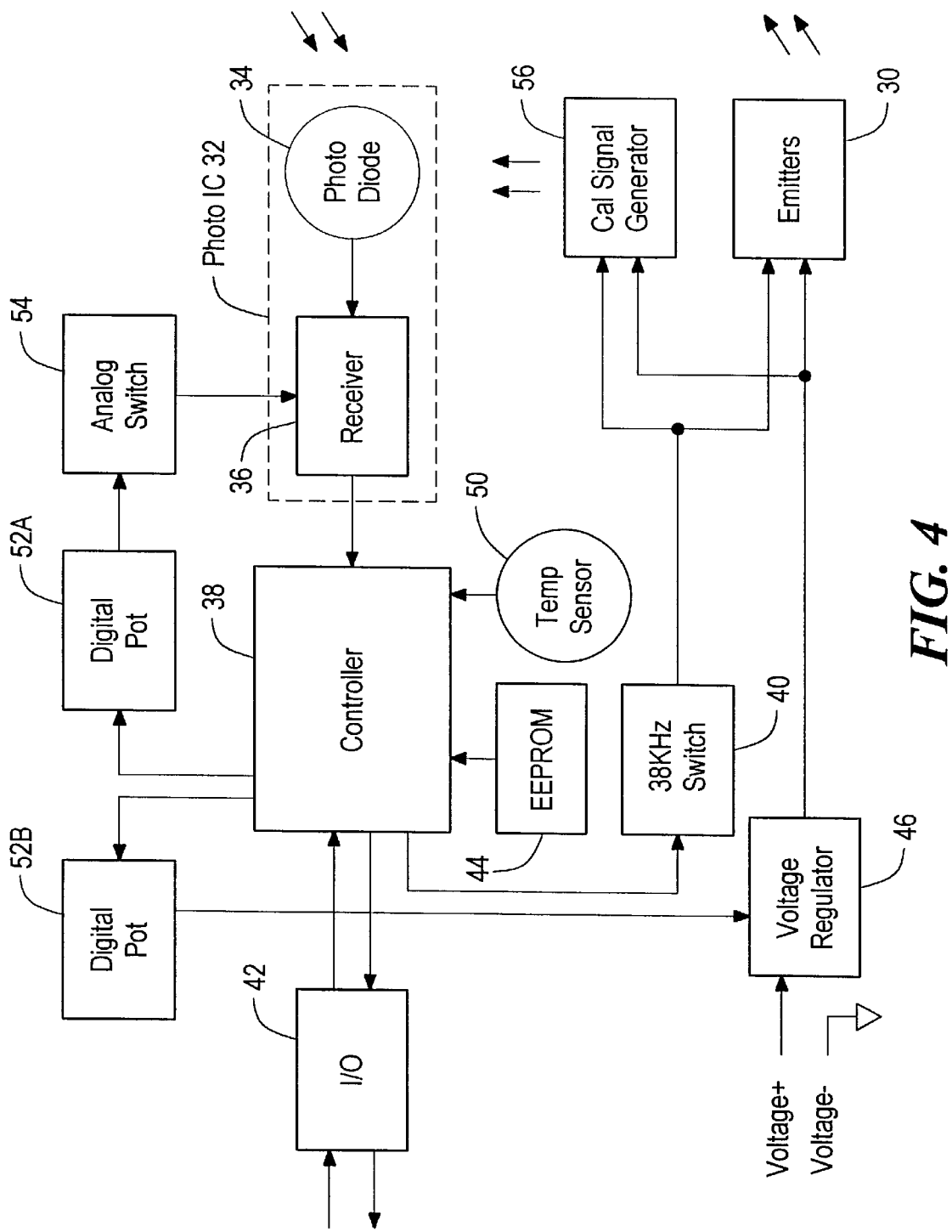
FIG. 4 is a further block diagram of the monitoring system of FIG. 1.

With respect to FIG. 4, a block diagram of an aperture monitoring system as presently disclosed is illustrated. This embodiment includes one or more radiation plane light emitting diodes (LEDs) (labeled here as Emitters) 30, a photo IC 32 including a photodiode 34 for detecting reflected radiation, and a controller 38. The radiation plane LEDs 30 are also referred to as radiation LEDs, radiation plane LEDs, IR LEDs, drive LEDs, measurement LEDs, or collectively as a measurement emitter. While other operating frequencies are possible, the radiation plane LEDs preferably emit at 38 KHz with a 90% duty cycle to avoid interference from other radiation sources including remote door controllers, solar emission, etc. A 38 KHz switch 40 enables emission at this frequency. The greater the energy level of the radiation received at the photodiode 34 and the receiver 36, the longer a pulse width for each of plural consecutive pulses in an output stream comprising a receiver output signal. Experimentally, it has been found that a receiver output pulse width of 30 ms to 40 ms in the absence of an obstacle is optimal for the presently disclosed system, though other time periods are employable. A threshold value for pulse length is established and stored in memory associated with the controller. For a receiver pulse width of 30 ms to 40 ms, a suitable threshold is +/−3 ms, though other threshold values may be employed according to the needs of the particular monitoring system embodiment. The controller compares detected receiver output pulse widths to the stored threshold value. If the output signal pulse width equals or exceeds the threshold, or simply exceeds, depending upon the embodiment, various responses may be provided.

Preferably, the controller 38 is capable of providing an output, through appropriate interface circuitry 42, which results in the stoppage of a closure for a respective aperture when desired. For instance, if a monitoring system is disposed adjacent a vehicle window such as that illustrated in FIG. 5, the output signal exceeding the threshold value preferably results in the inhibiting of further window express mode closing (or opening). Alternatively, the respective closure, in this case the driver's side window, may be commanded to reverse its motion and move to the fully open position. In addition, the controller 38 may provide an output indicative of threshold achievement for the purpose of initiating some form of aural or visual alarm.

When it is stated that the controller 38 determines whether a stored threshold value has been exceeded, this can mean either that the output pulse widths in the receiver 36 output signal are longer than a pulse width threshold, such as would be the case for a system which identifies an obstacle near or within an aperture through an increase in reflected radiation, or that the output pulse widths in the receiver 36 output signal are shorter than a pulse width threshold, such as would be the case for a system which identifies an obstacle through a decrease in reflected radiation. Thus, the term "exceeds" in this context is relative to the particular monitoring system embodiment.

Other elements making up the aperture monitoring system as presently disclosed include a read-only memory element (such as the illustrated EEPROM 44), a voltage regulator 46, a temperature sensing element 50, first and second digital potentiometers 52A, 52B, an analog switch 54, and a calibration signal generator 56. The EEPROM 44 is provided as storage for controller 38 data including threshold values for comparison against the receiver 36 output. The voltage regulator 46 provides variable power to the calibration signal generator 56 and the radiation plane LEDs 30. The temperature sensor 50 provides an indication to the controller 38 of the operating temperature for the monitoring system. The digital potentiometers 52A, 52B are used to adjust the receiver gain and the output level of the calibration and radiation plane LEDs 56, 30, based in part on the ambient temperature, as discussed below. The analog switch 54 represents a gain control element for the receiver 36.

Further details regarding the elements of FIG. 4 are provided in the following text.

Figure 5:
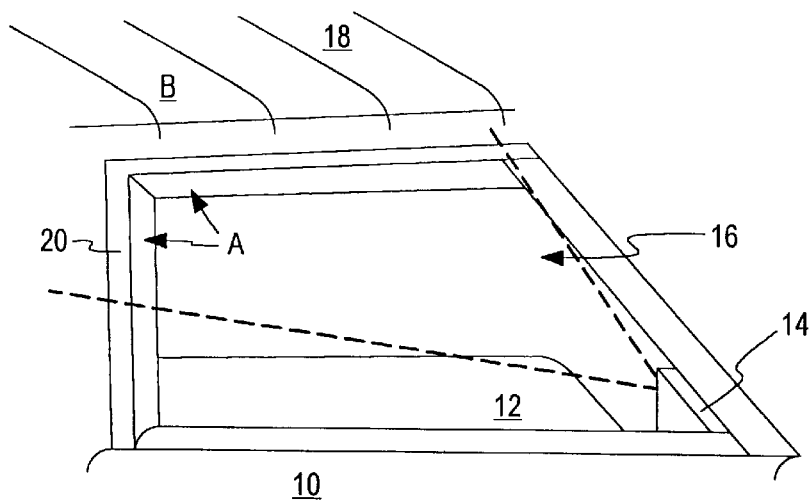
FIG. 5 is a perspective view of the interior of a vehicle door illustrating surfaces which reflect radiation emitted by the aperture monitoring system of FIG. 1.

An interior view of a vehicle window environment and door 10 is provided in FIG. 5. The emitter/detector unit 14 is shown generating the radiation field 16 adjacent the window 12 opening. Certain surfaces in this environment act as reflectors for the radiation field. For instance, the window frame 20 may have certain surfaces A which are intended reflect a significant portion of the radiation field back to the detector 14. Obstacles disposed within the radiation field in this embodiment absorb radiation, thus lowering the reflected radiation below an alarm threshold. Alternatively, it may be desired that these surfaces A absorb a significant portion of the incident radiation, and obstacles in the radiation field reflect a quantity of radiation significant enough to raise the level of reflected energy above a given threshold.

In either case, the signal to noise ratio (SNR) of an aperture monitoring system disposed adjacent an aperture may be too low for reliable operation. This may be the result of an original aperture trim material which is not optimized for the proper functioning of the monitoring system. Alternatively, the aperture trim or other reflecting surfaces may be damaged in a collision or through repeated wear. Further still, the reflecting trim may age in a fashion that degrades the reflectivity to a degree that the performance of an aperture monitoring system is unreliable. Such unreliability may result either in false alarms indicative of an object within the aperture radiation field when none is present, or in lack of an alarm condition when an obstacle is in fact present.

As previously noted, the aperture monitoring system described may be disposed within a variety of settings such as within a vehicle, an industrial environment, or any other environment having an aperture requiring some form of monitoring. In order to augment the SNR of such systems, certain materials having advantageous radiation reflecting or absorbing properties may be applied to one or more of the respective reflecting surfaces. For the vehicle window environment of FIG. 5, such materials could be applied to one or more window frame surfaces A.

The choice of material to be applied depends in part upon the type of radiation employed by the monitoring system. Infrared (IR) radiation is preferred for vehicular applications due to its low power consumption and invisibility to vehicle operators and passengers.

Ultrasonic monitoring may be employed, though more preferably in an industrial or other non-vehicular application. This is because ultrasound transducers typically require higher voltage than infrared transducers, and because the time shift in signals reflected off an obstacle within or proximate to an aperture relative to those reflected off the aperture environment are extremely small, rendering them difficult to detect over the relatively short distances within a vehicle aperture. Such distances may be larger in an industrial setting, making ultrasound a viable option in those applications. However, as detector technology evolves, ultrasound may be a viable alternative in vehicular applications as well. The present disclosure should therefore be read to encompass the use of ultrasound in vehicles for the stated purposes of aperture monitoring and obstacle detection. For an ultrasound transducer, it would be preferable to provide a material which absorbs the radiation generated by the emitter, such that the reflected signal from an object would be greater in a relative sense.

Yet another option for the monitoring system radiation is visible light, such as that generated by a laser. Once again, higher power consumption is a detracting factor for vehicular use. Further, a visible light system would necessarily generate a visible light field during operation, a characteristic which could prove distracting to a vehicle operator, particularly at night. These factors may not be significant in other, non-vehicular settings.

For an infrared-based aperture monitoring system which relies upon an increase in reflected energy as a result of emitted radiation reflecting off an obstacle within the radiation field, an energy absorbing material such as solar absorbing or optical black material (i.e. infrared light trapping) could be employed. Exemplary materials for promoting the selective absorption of radiation include natural and synthetic textiles such as leather, rubber, plastics and metals with or without surface enhancements including coatings, colorings, dyes, paint, and/or embossments. The material can be applied to the aperture environment surfaces in the form of an adhesive tape bearing an outer layer of solar absorber. Alternatively, a liquid suspension of dyed IR light trapping particles in an adhesive medium may be applied to an appropriate surface via a brush, roller, or pressurized spray.

For an infrared-based monitoring system which relies upon the energy absorbing characteristics of an obstacle within a radiation field, it is preferable to maximize the reflected radiation. This can be achieved through the use of specular or diffuse reflectance materials, applied to the principally reflecting surfaces on an adhesive tape substrate or in liquid suspension in an adhesive medium via brush, roller or pressurized spray. Such materials may be manmade synthetics such as fabric, plastic or processed metallics, as well as processed (i.e. colored, dyed, painted, embossed) natural textiles, including rubber or leather. Alternatively, certain infrared-reflecting features imprinted on an adhesive substrate suitable for application on the radiation reflecting surfaces adjacent the respective aperture. For instance, the features may include metallic inverted pyramids or similar features which tend to reflect infrared radiation in the fashion of corner-reflectors.

For aesthetic purposes, it may be preferable to employ reflection altering materials which are suspended in a clear or colorless adhesive-based liquid. Of course, this may not be possible in the context of a metallic reflection altering material, particularly one having physical features such as miniature reflectors. In the latter case, it may be necessary to provide the reflection altering materials as a separate trim piece. For a vehicle window aperture, such an additional trim piece would be preferably contoured to adapt to the existing trim adjacent the aperture. Installation can be through the use of adhesive, via interference fit, or other friction-fit members.

Figure 6A:
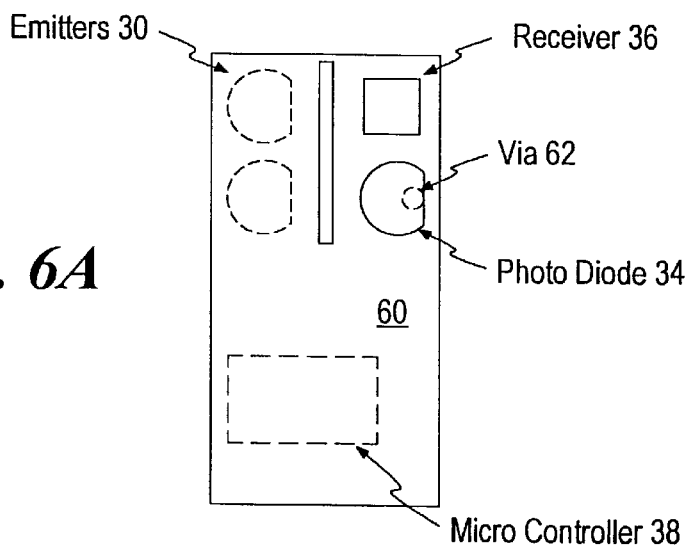
FIG. 6A is a plan view of a circuit board for mounting elements of the monitoring system of FIG. 1.
Figure 6B:
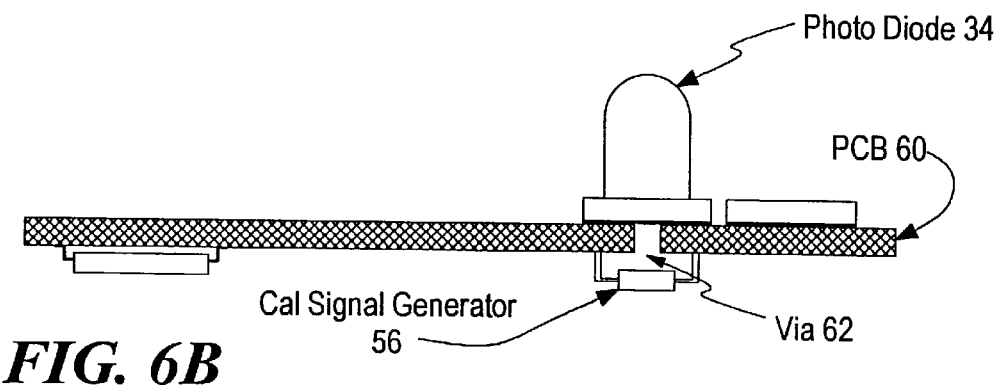
FIG. 6B is an elevation view of the circuit board of FIG. 6A.

A calibration signal generator 56, which may be a light emitting diode (LED), is illustrated in FIG. 4. This LED 56 is preferably disposed on a single circuit board 60, as shown in FIGS. 6A and 6B, along with the other system elements. In order to make the monitoring system as unobtrusive as possible in a vehicle application, it is preferred to densely pack the elements on the circuit board 60, the latter having plural conductive and insulating layers. This enables the circuit board 60 to have circuitry on both sides, as shown in FIG. 6B. In one embodiment, the receiver and photodiode 34 are disposed on a side of the circuit board 60 opposite the bulk of the remaining circuitry, including the calibration LED 56. This facilitates electromagnetic isolation of the receiver, leading to improved system performance. However, separating the receiver portion of the monitoring system circuitry from the remainder of the system presents a challenge in how the calibration LED 56 provides reference radiation to the receiver 36 and photodiode 34.

To address this issue, an alternative system circuit design was considered. Rather than providing a reference LED 56, an electrical calibrating signal of known amplitude can be injected into the photodiode node, prior to the receiver 36 input. The system would then measure the resulting pulse length prior to using the IR LEDs 30. This enables the calibration of the receiver 36 to the injected standard. However, the input node for the receiver 36 is extremely sensitive; the trace linking the photodiode 34 and the receiver input is made as short as possible. Adding another conductor to this node will most likely cause unwanted fluctuations in the receiver output.

In addition, the use of an electrical signal requires that the IR LEDs 30 be compensated for temperature sensitivity. These LEDs 30 show decreased efficiency with an increase in temperature. This necessitates circuitry for accurate detection of ambient temperature, as well as circuitry for enabling the control of the drive current for the IR LEDs 30 with temperature variation. Finally, if the decreased efficiency of the IR LEDs 30 is compensated for, the receiver's increased efficiency with increased temperature will require a higher degree of loop gain necessary to keep the system at a stable operating point.

To overcome these deficiencies, it is preferred to use a separate calibration LED 56. This LED 56 is separately controlled with respect to the IR LEDs 30. A small aperture such as a plated via 62 through the printed circuit board is provided between the calibration LED 56 (also referred to as the reference LED) and the photodiode 34 in the receiver portion of the monitoring system. The calibration LED 56 is preferably chosen with temperature response characteristics similar to those of the IR LEDs 30. As will be described subsequently, certain procedures are employed to calibrate the calibration LED 56 drive current with a desired receiver output. Thus, by providing calibration and IR LEDs 56, 30 having the same or similar temperature response curves, it is possible to account for the temperature response of the IR LEDs 30 through the normal calibration process prior to each use of the monitoring system.

A further advantage of employing a calibration LED 56 and IR LEDs 30 having a common temperature response curve which is inverse to that of the receiver 36 is that at least a portion of the temperature-dependent variation in receiver performance is automatically offset by the decrease in LED efficiency with increased temperature. This results in a reduction in the overall loop gain necessary to keep the monitoring system at a stable operating point.

Experimental results indicate that a 30 ms to 40 ms output pulse is the optimum value for output pulse widths from the receiver, though higher or lower periods are used in alternative embodiments. It is therefore desired to have the receiver output be in this range in the absence of an obstacle in or proximate the aperture being monitored. This is achieved by activating the calibration LED 56, whose radiation impinges upon the photodiode 34 of the photo IC 32 in the receiver section of the system, then adjusting the receiver gain by the controller 38 to produce a desired output pulse width. The calibration LED 56 drive current is used to determine the proper drive current for the IR LEDs 30, which should then produce the same receiver output in the absence of obstacles. This is because a previously performed calibration step (discussed below) correlates the drive current for the calibration LED 56 with the drive current for the IR LEDs 30 such that both produce the same output from the monitoring system receiver 36, the calibration LED 56 by emitting radiation through the via 62 in the circuit board 60, and the IR LEDs 30 through emitting radiation adjacent and/or within the respective aperture and causing a given amount of radiation to be reflected back to the photodiode 34. In one embodiment, the calibration LED 56 is activated for this purpose for approximately 10 mS.

Thus, by employing the calibration LED 56 in the presently disclosed aperture monitoring system, reliable performance can be achieved over a broad range of operating temperatures. The calibration LED 56 is utilized in three initialization steps which are preferably employed in this monitoring system.

Figure 7:
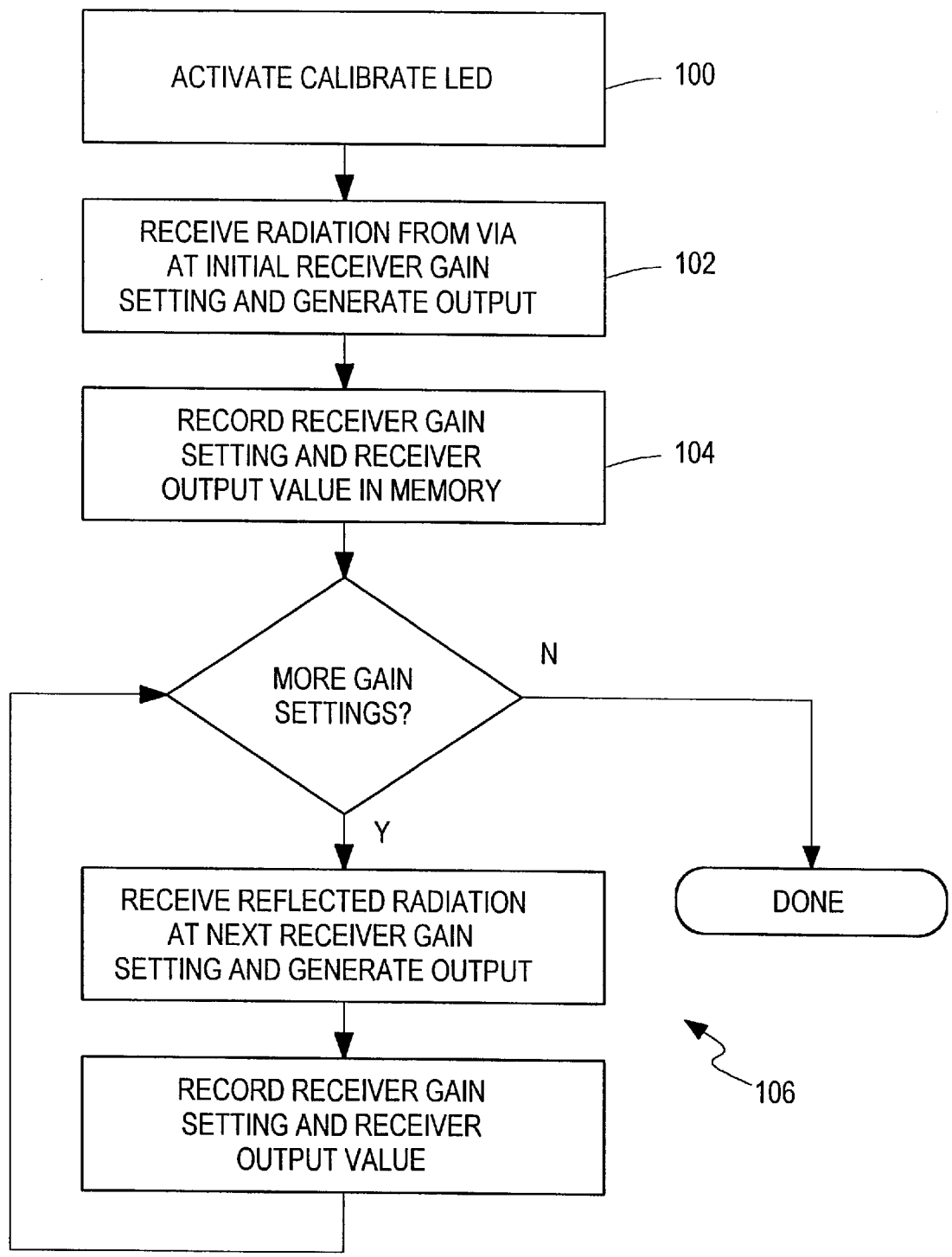
FIG. 7 is a flow chart illustrative of a first calibration procedure performed by the monitoring system of FIG. 1.

A first calibration procedure is described in conjunction with FIG. 7. The calibration LED 56 is activated 100 and the emitted radiation which passes through the via 62 is received by the photodiode 34 at an initial receiver gain setting 102. The initial receiver gain setting and the corresponding output signal, or a representation thereof, are recorded 104 in a memory element (not shown) associated with the controller 38. This memory element can take the form of any non-volatile storage element, such as an NVRAM. The receiver gain is then varied in order to establish system calibration constants between the receiver gain and output pulse width for a given value of calibration LED drive current. These calibration constants are also stored in the memory element 106. During normal use, the controller 38 relies upon these calibration constants to assist in adjusting the receiver gain such that a desired output pulse width is obtained. This first calibration routine (FIG. 7) can be performed before the monitoring system is installed in the respective environment to be monitored, or after initial installation but prior to first use.

Figure 8:
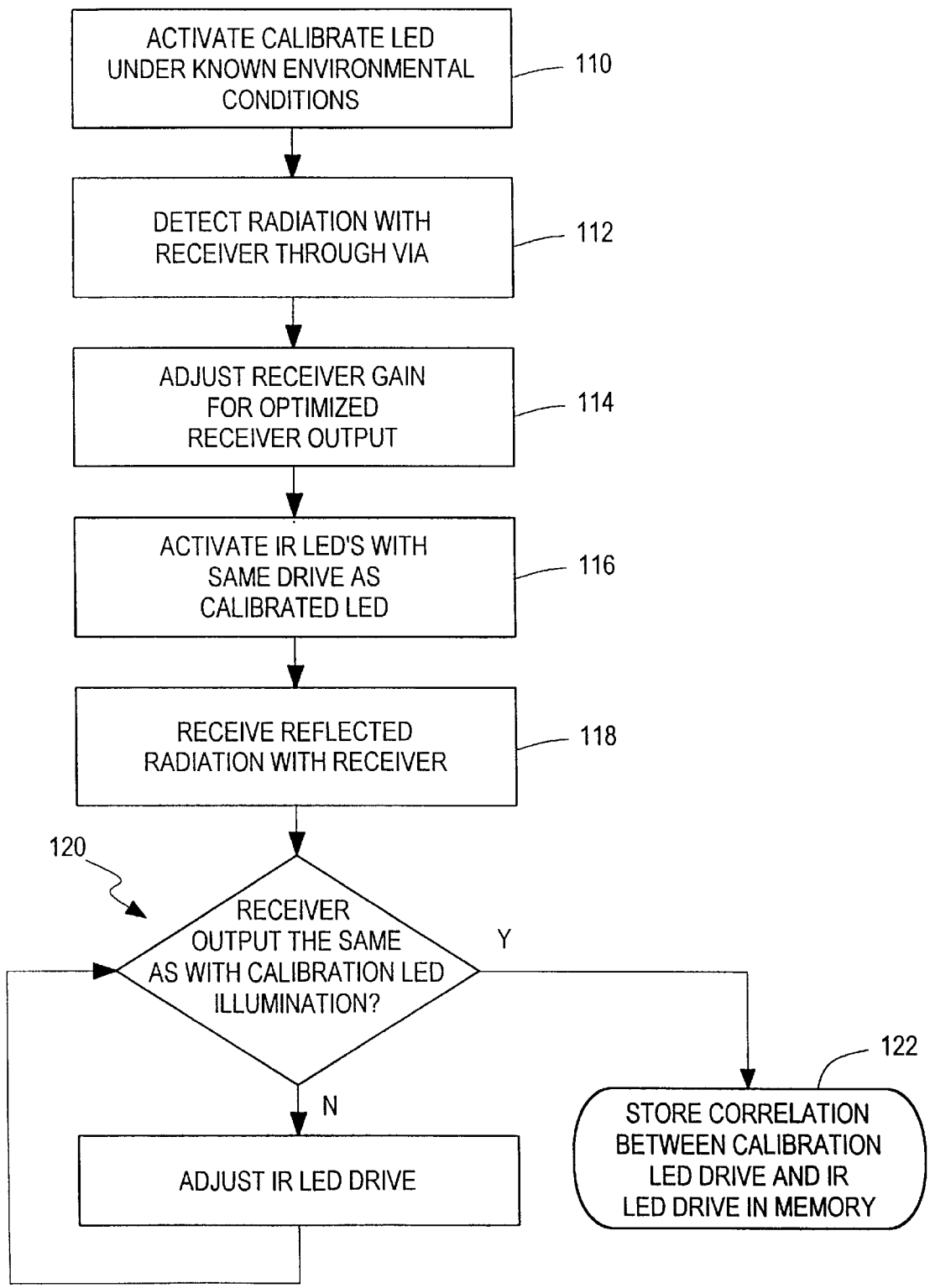
FIG. 8 is a flow chart illustrative of a second calibration procedure performed by the monitoring system of FIG. 1.
Figure 9:
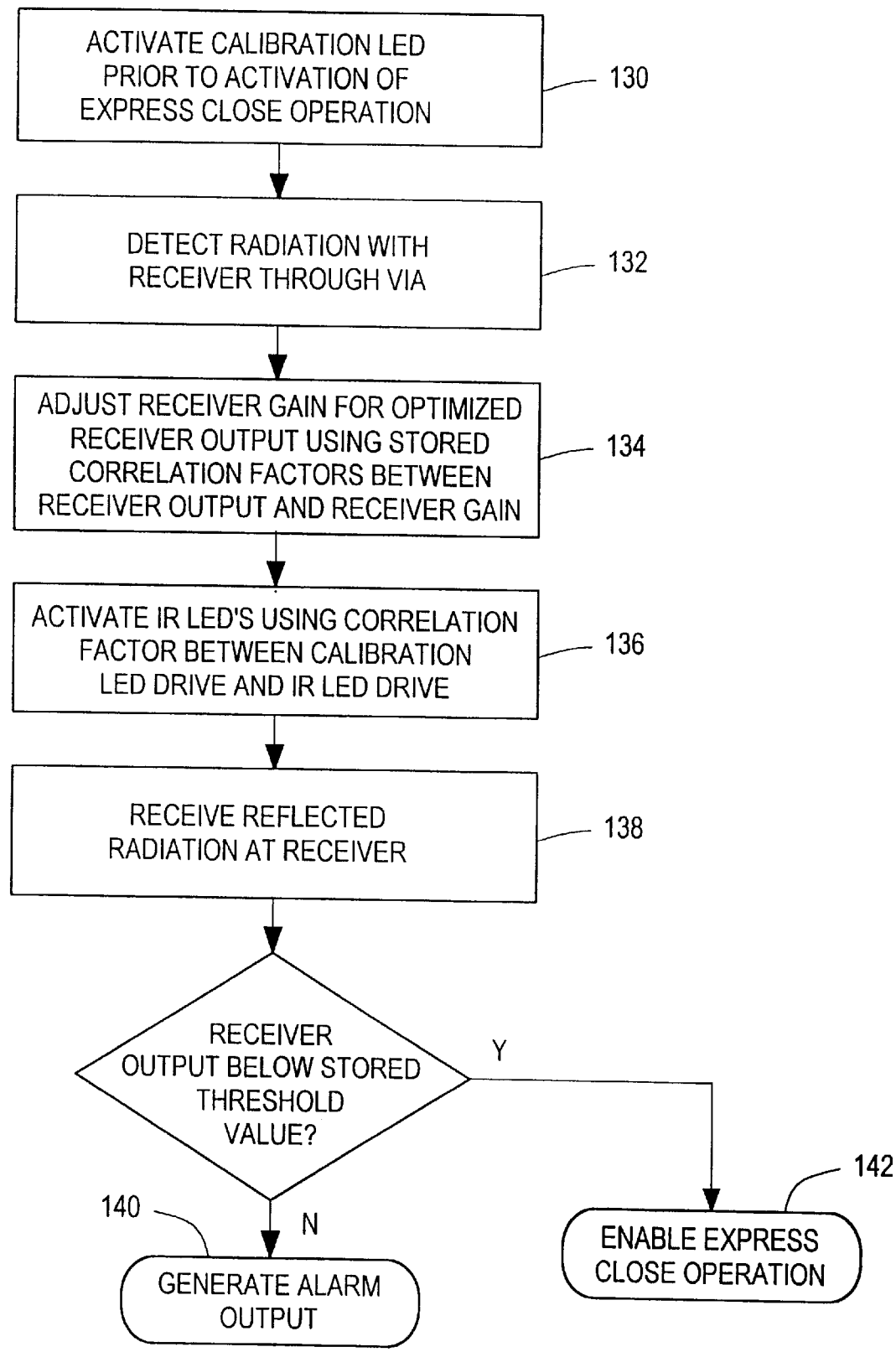
FIG. 9 is a flow chart illustrative of a third calibration procedure performed by the monitoring system of FIG. 1.

A second calibration procedure, shown in FIG. 8, is performed after the monitoring system is installed in the operational environment. The calibration LED 56 is activated 110 and the radiation emitted therefrom is detected by the photodiode 34 from the via 62, 112. The receiver gain is then adjusted, using the correlation factors from the first calibration procedure, to obtain a desired receiver output 114. The IR LEDs 30 are then activated with the same drive current as applied to the calibration LED 56, 116, and the reflected radiation is detected by the photodiode 34, 118. The drive current for the IR LEDs 30 is adjusted until the receiver output is the same as that provided when the photodiode 34 was illuminated by the calibration LED 56, 120. This establishes a correlation between calibration LED drive current and IR LED drive current, which is then stored 122 in memory such as the memory described in conjunction with FIG. 7. The present aperture monitoring system is thus adaptable to many environments, each having its own distinct radiation reflecting characteristics.

A third calibration procedure is preferably executed immediately prior to each use of the monitoring system. The calibration LED 56 is activated 130 and the photodiode 34 detects this illumination through the via 62, 132. The receiver gain is adjusted 134, using the correlation factors from the first calibration procedure (FIG. 7), until a desired receiver output pulse width is obtained. Then, the drive current to be supplied to the IR LEDs 30 is determined 136 by the controller 38 based upon the drive current supplied to the calibration LED 56 and the correlation factor determined in the second calibration step (FIG. 8). The IR LEDs 30 emit radiation using this drive current during monitoring system operation, and the photodiode 34 receives the reflected radiation 138. If the output pulse width equals or exceeds a predetermined threshold value, an obstacle may be present or proximate the aperture, and an alarm condition is flagged by the controller 38, 140. Otherwise, normal system operation is enabled 142.

Whether the third calibration step is performed immediately prior to each use of the monitoring system, prior to every x uses of the monitoring system, or is performed on a time-dependent basis depends upon the specific environment of the monitoring system, the expected or empirically determined rate of change in radiation reflectance characteristics of the aperture environment, or the need to minimize power consumption.

The previously described embodiment providing plural calibration procedures is for an aperture monitoring system employing infrared light emission and detection. However, a similar arrangement of components could be utilized for an embodiment employing optical wavelength emitters such as lasers or optical LEDs and suitable detectors. A further embodiment may be envisioned upon sound-based emitters and detectors.

As previously described, the emitters and detector for the infrared-wavelength aperture monitoring system are susceptible to performance variations in response to temperature change. In order to address this temperature sensitivity, the presently disclosed system has elements which provide an indication of ambient temperature, thus providing the ability to adjust system parameters to compensate for temperature-based performance fluctuations. In one embodiment, a temperature sensor 50 such as a thermistor provides an indication of ambient temperature. However, an alternative, lower power embodiment employs a transistor and resistor R disposed between the IR LEDs and ground (see FIG. 10). Vbe for this transistor, which varies linearly with temperature, is monitored by the controller. For an exemplary transistor, the temperature response is 3.5 mV/degree C. If Vbe is initially measured and recorded at a known temperature and if the linear temperature response of the transistor is known, the controller is able to extrapolate the present temperature based upon the current Vbe value. The correlation between Vbe and temperature and the temperature response curve for the LEDs are preferably stored in conjunction with the controller 38, such as in the EEPROM 44. Having established the present temperature, the controller 38 utilizes a first digital potentiometer 52A (also known as a resistor digital-to-analog converter (RDAC) or digitally controlled variable resistor) to control a voltage regulator, which in turn sets the receiver gain. In the embodiment shown in FIG. 4, the voltage regulator is embodied in a single pole, dual throw (SPDT) analog switch 54. The digital potentiometer 52A output is connected to the common input of the switch which is in turn switched under the control of the controller 38. Thus, the output of the digital potentiometer 52A is switched through to the receiver 36 bandpass amplifier.

Figure 10:
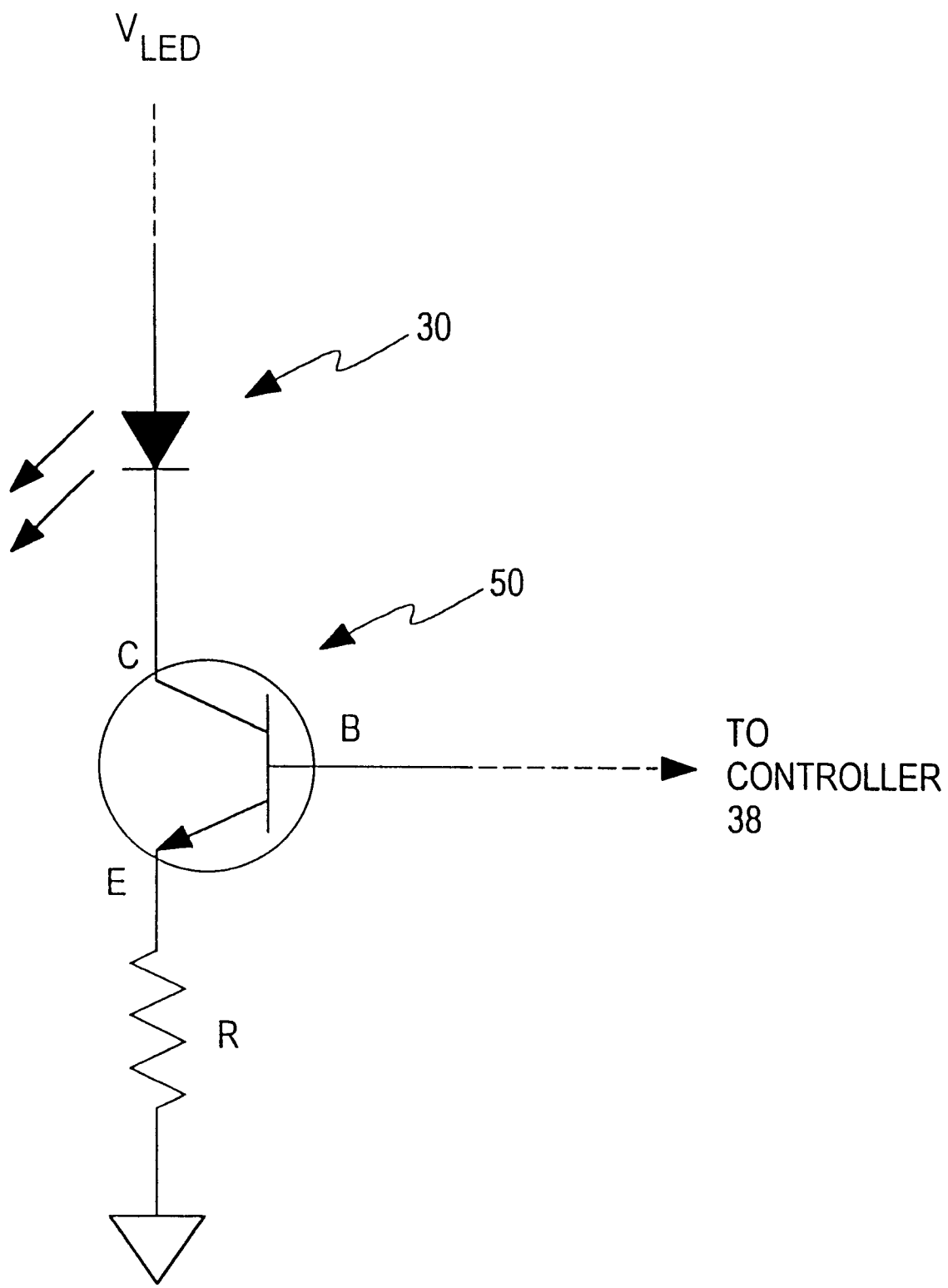
FIG. 10 is a schematic diagram of circuitry useful for deriving ambient temperature in the monitoring system of FIG. 1.

The temperature compensation circuit of FIG. 10 is also used to automatically adjust LED brightness in response to temperature variation. As known to one skilled in the art, LED brightness typically decreases with increased temperature. However, if the controller maintains a constant base voltage for the transistor of FIG. 10, the collector current (and thus the LED current) will increase with rising temperature, given the relationship between Vbe and ambient temperature. Thus, with the appropriate choice of base resistor, the rate of change of LED current can be set to offset the change in any LED brightness that might result from ambient temperature changes.

A second digital potentiometer 52B can be used to control the brightness of the calibration and IR LEDs 56, 30 by providing an input to a voltage regulator 46, such as through a feedback input. The voltage regulator is therefore used as an adjustable current supply. The controller is able to adjust the current supply to the calibration and IR LEDs 56, 30 by manipulating the second digital potentiometer 52B, which in turn alters the output of the voltage regulator. In a further embodiment, the first and second digital potentiometers 52A, 52B are provided by an RDAC activated at two different times in the detection cycle, once to set the gain and the other to control the current.

It is also possible in a further embodiment for the controller to compensate both for emitter (e.g. LED) and receiver (e.g. photodiode) temperature response by altering one of the emitter drive current or the receiver gain rather than both.

In summary, it is preferred to maintain a relatively constant source of radiation which only requires adjustment in response to detected variations in temperature. Receiver gain is adjusted in order to maintain the "no obstacle" receiver output at a target value.

Aperture environments which reflect the emitted radiation of the monitoring system are prone to change with time. For instance, within a vehicular installation, trim material adjacent a window may age, resulting in a gradual change in the radiation reflecting properties of the materials. As a further example, roof liners in some older cars are prone to sag which may interfere with the reflecting properties of window trim.

These changes will impact the performance of an aperture monitoring system in one of two ways. The system may begin to report false instances of detected objects within or proximate to the respective aperture, or may fail to report obstacles which are actually present. This is because a correlation between the calibration LED 56 and the IR LEDs 30 was established under conditions which no longer exist. The calibration LED 56 is activated and the receiver gain is set to result in a desired output pulse width. The controller 38 refers to the correlation factor between the calibration LED 56 and the IR LEDs 30 to set the drive current for the IR LEDs 30. In the absence of an obstacle, the output of the receiver 36 should be the same as that generated in response to the calibration LED 56 illumination. However, because the aperture environment has changed, the receiver output pulse width may be closer to or farther from the threshold value stored in the EEPROM 44. Under such conditions, it is preferable to allow the monitoring system to automatically correct for such gradual changes.

To accomplish this, it is necessary for the monitoring system to have the capability to detect a change or drift in the receiver output in the absence of an obstacle. This can be achieved by storing the difference between the receiver output pulse width and the desired output pulse width value for each of x prior uses of the monitoring system that did not report the presence of an obstacle, where x is a positive integer. The controller may be provided with the ability to store such data in a non-volatile memory element (not shown) such as an NVRAM. The x data points are averaged together to form an average offset between receiver output pulse width and a desired output pulse width value. The prior uses of the monitoring system for which data are stored are each preferably associated with a particular outcome from an aperture closure attempt. For instance, data may be stored only for uses of a window monitoring system when a vehicle power window is raised without detection of or impact with an obstacle. The stored difference may also be characterized in terms of the actual receiver output and the preset threshold.

In an alternative embodiment, the determination of a change in monitoring system performance is made with respect to an obstacle, inserted within the radiation field, which provides a known level of reflectance. This test obstacle may be provided with features for the purpose of predictably locating the test obstacle in one position within the radiation field to enhance the predictability of the reflected radiation. The known contribution to reflected radiation can then be subtracted from the returned signal in order to gauge the alteration in background reflectance against a previous, similar measurement. Likewise, the second calibration step described previously, in which the drive for calibration LED and the IR LEDs are correlated, can be performed with such a test obstacle in place such that a predictable radiation return is provided.

The monitoring system parameters can then be adjusted by an amount which would be necessary to move the receiver output from the average offset to the desired value. This can be achieved either by adjusting the IR LED drive current for each subsequent use of the monitoring system, or by adjusting the receiver gain for each subsequent use. The former is achieved by generating a correction factor for the correlation value between calibration LED drive current and IR LED drive current, and applying that correction factor each time the proper IR LED drive current is calculated. The latter is achieved by generating a correction factor for the calibration constants established at installation for receiver gain.

The value for the variable x may be preset, or may change based upon a predicted rate of change for the aperture environment or based upon an empirical analysis by the controller of the rate of change of the aperture environment as evidenced by the individual offset values stored in memory.

Other uses of the stored offset data are possible to address the problem of environment change. The monitoring system controller may be adapted to adjust monitoring system parameters by an amount which would be necessary to adjust the receiver output by a percentage of the average offset. LED or receiver parameters may be adjusted to effect this change. As a further modification, the percentage may be a predetermined percentage, or may be variable, depending at least in part on the rate of change in the offset values over x uses of the monitoring system.

Historical sampling may also be the basis for determining the historical offset, if any, between actual receiver output pulse width and a desired receiver output pulse width in the absence of an obstacle. For instance, output samples from every x out of y previous uses of the monitoring system may be employed in determining an average output value.

Further, the controller may rely upon a second threshold value stored in memory. If an offset between the receiver output pulse width and the alarm threshold previously referred to exceeds the second threshold in each of the past x uses of the system, or in x out of y uses of the system, where x and y are both integers and y is greater than or equal to x, then an adjustment to the system parameters, as previously described, is effected. The amount of the offset may also be determined as previously described.

Various combinations of these approaches to factoring in past system performance into a correction factor may be made.

Finally, in an alternative embodiment, it is possible to effect such changes in the system parameters to recalibrate the receiver output each time the system is used and no obstacle is detected, but without reference to previous detection values. This can include adjusting system parameters to reset the receiver output to a desired pulse width, or reset the receiver output by a percentage of a measured offset between measured output pulse width and a target value or a threshold value. The percentage offset for this embodiment and the averaging embodiment above may be less than or greater than the difference between the receiver output pulse width and the desired value (i.e. the receiver output pulse width when the calibration LED is activated). If performed only under ideal conditions, such as when the vehicle is empty, the doors are closed, and the windows are closed and free from objects in the radiation reflecting field, this embodiment is preferred for recalibrating system parameters. However, absent such conditions, this embodiment is less preferred because it may fail to compensate for aberrations in system output, and may result in rapid swings in the desired receiver output relative to the alarm threshold, resulting in a higher likelihood of false alarms.

In an aperture monitoring system not provided with the capability to store past output values from the receiver, a facility must be provided to correct for changes in the aperture environment which might otherwise result in the generation of false alarms. As previously noted, aperture environments may change over time in terms of their radiation reflectance properties. Further, an aperture environment may change suddenly, for instance as a result of damage to the environment or due to modification. In vehicular applications, such change may result from an accident or through modification by the vehicle owner.

The previously described embodiments are provided with the ability to adjust to environmental changes as long as the receiver output does not cross an alarm threshold. Therefore, even if a monitoring system is provided with the ability to adjust to gradual changes in aperture environment, a sudden change may frustrate the system's ability to adapt by modifying system parameters.

A further element is preferably provided to an aperture monitoring system in order to initiate calibration or recalibration. Use of this element causes the currently detected radiation, as reflected from the surfaces in the aperture environment and in the absence of an obstacle, to be used as the basis for the calibration or recalibration. The same element may be utilized for initial installation and calibration as described above and for recalibration in case of environmental change, or alternatively separate elements may be used for each purpose. For instance, it may be preferable to provide a more fully featured element for initial installation, including the ability to manually set desired receiver output pulse width values, to set or adjust the number of historical values stored for dynamic parameter adjustment as previously described, or to set other parameters. Another recalibration element more suited for use by an end-user may only have the ability to command the performance of one or more of the initial calibration procedures for the purpose of recalibrating the monitoring system.

Certain currently manufactured vehicles have one or more internal data communications networks over which various vehicle control modules communicate. An exemplary communications network is a Class 2 bus such as used in General Motors vehicles, as known to one skilled in the art. Communicating over such a network is at least one electronics module responsible for interfacing between vehicle occupant-controlled actuators and power-operated apertures such as windows, a sunroof, one or more power doors, etc. An exemplary electronics module is a body control module as employed by Chrysler or a zone module as used by General Motors. The actuators are typically switches which can be actuated momentarily (e.g. <0.3 seconds) to initiate or cancel an express close mode of operation, or can be actuated for a longer period of time to operate the associated aperture closure for as long as the actuator is manipulated. The low-voltage signals from the actuators are received by the electronics control module, and the latter provides control signals to a motor or motors associated with a respective aperture closure.

A calibration- or recalibration-initiating element is referred to herein as a cal element for convenience. The cal element enables a user to cause an interconnected aperture monitoring system to go through one or more of the calibration steps described previously. To repeat, a first calibration step correlates the calibration LED drive current to the receiver gain necessary to achieve a desired receiver output pulse characteristic. This step is normally performed once, either by the manufacturer of the monitoring system circuit or upon initial installation in the aperture environment, though these times are not exclusive and a repeat performance of this calibration step may be necessary if certain monitoring system components are replaced. A second calibration procedure establishes a correlation between calibration LED drive current and IR LED drive current. This is performed once the aperture monitoring system is installed in the intended environment, and is the most likely calibration step to be repeated with the use of the cal element. A third calibration, preferably though not necessarily performed prior to each use of the monitoring system, involves the fine tuning of the calibration LED drive current with the receiver gain such that the receiver output is of a desired characteristic prior to activating the IR LEDs. The third calibration step is normally run every time the monitoring system is used.

As mentioned, the aperture environment can degrade or change through age, wear, damage or modification. By running the second calibration step again, the proper IR LED drive current can be established for the current aperture environment. An electronics control module can serve as an interface for the cal element. Various embodiments of the cal element are provided for generating different signals for calibration or recalibration. For instance, the cal element can generate a simple "ON" signal, such as a TTL high voltage level, to signal the initiation of a calibration procedure. Alternatively, the cal element can communicate a specific sequence of bits to a monitoring system which has the intelligence to recognize such a bit stream as a calibration command. Further still, the cal element may provide a bit stream to an intermediate element such as an electronics control module, which then sends a simple "ON" signal to an associated aperture monitoring system. The latter communication from the cal element may also include a data stream identifying the appropriate monitoring system if the electronics control module is interfaced to more than one.

Figure 11A:
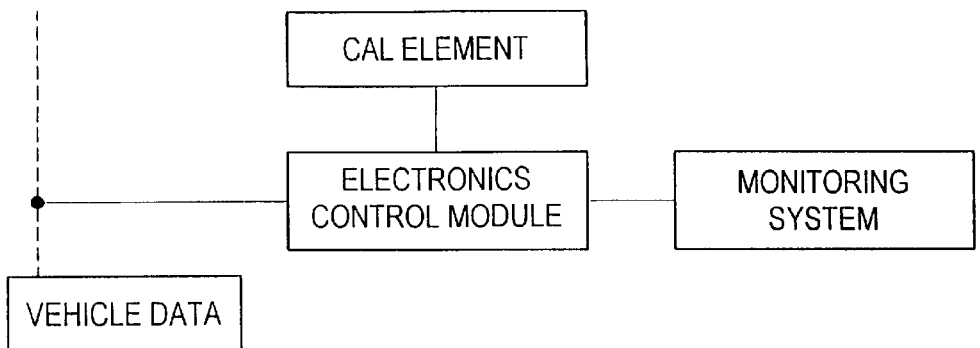
FIGS. 11A through 11F illustrate various arrangements of elements of the monitoring system of FIG. 1.
Figure 11B:
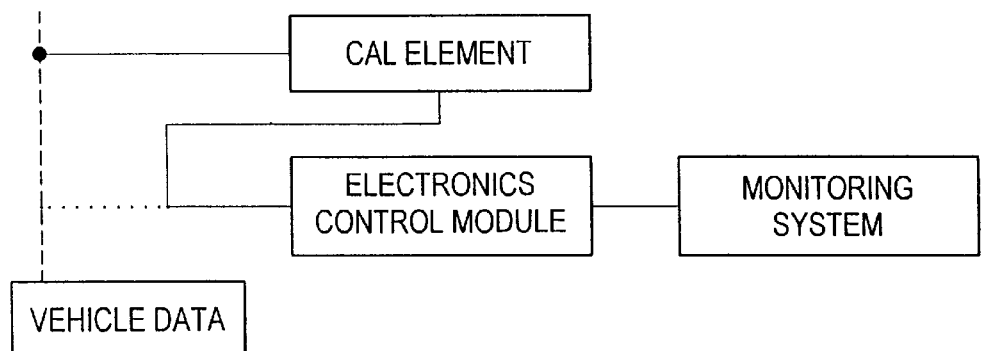
Figure 11C:
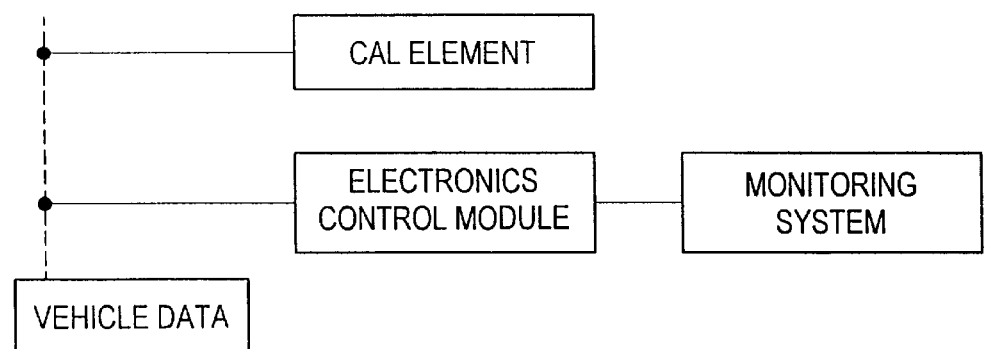
Figure 11D:
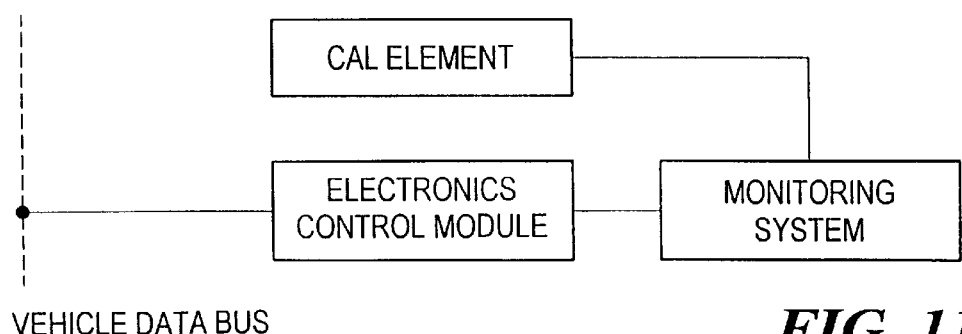
Figure 11E:
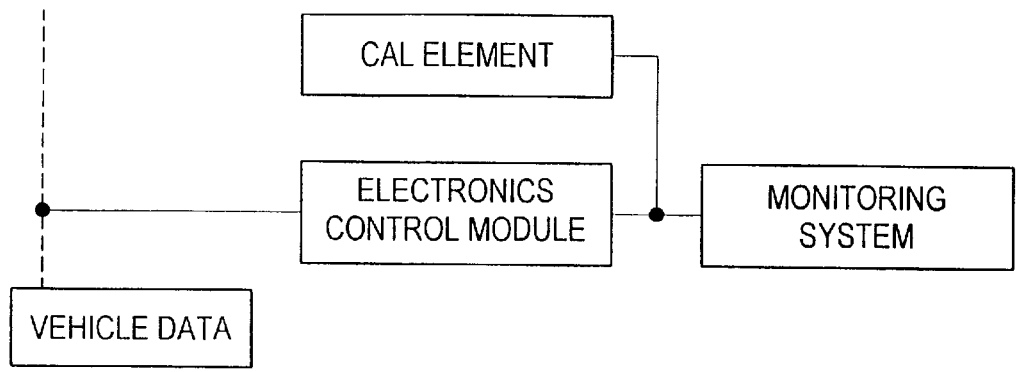

The connection between the cal element and the electronics control module can be by direct cable connection to a port on the electronics control module (FIG. 11A). Alternatively, the cal element may be interjected into the vehicle network by disconnecting a network bus connector at some point, such as at the electronics control module itself, and connecting the cal element in serial with the bus (FIG. 11B). Further still, the cal element may be connected into the vehicle data bus and then communicate to the electronics control module over that bus (FIG. 11C). If the monitoring system has the capacity to respond to the cal element directly, then the cal element can be connected directly to the monitoring system through a dedicated connector (FIG. 11D), or by interjecting the cal element into a data path between an electronics control module and the monitoring system (FIG. 11E).

Figure 12A:
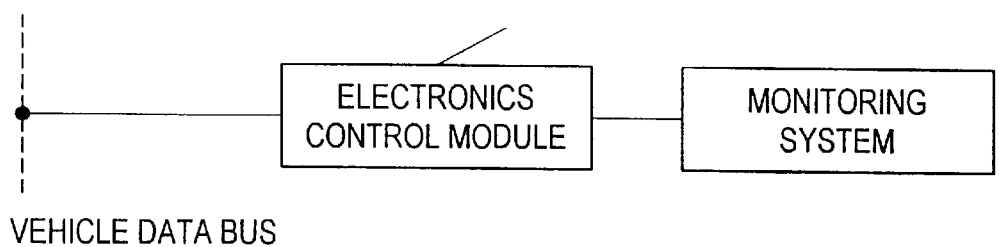
FIGS. 12A and 12B illustrate further embodiments of the monitoring system of FIG. 1.
Figure 12B:
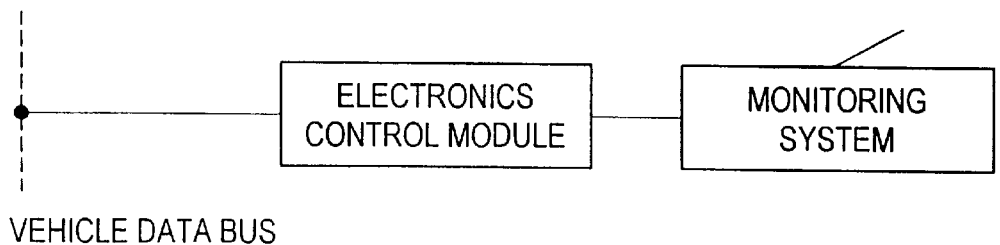

For these examples, the cal element itself can be provided as one of a variety of embodiments. For instance, in a simplest form, the cal element can have a user switch which results in the generation of a prescribed voltage on an output. Such a switch may be provided, for instance, on the electronics control element (FIG. 12A) or in conjunction with the monitoring system itself (FIG. 12B). This output is connected to an element which recognizes the voltage level as a command to initiate a calibration procedure. Switch activation on the cal element can also initiate the output of a bit stream which is recognized by the electronics control module or monitoring system as a calibration command. The latter can be provided by a simple circuit employing a battery or other power source, a processing element, and a memory element such as an EEPROM or register for storing the desired output pulse train.

Alternatively, the cal element can be provided as a computing device such as a desktop computer, a laptop, or a palmtop. Each such device would be provided with the appropriate output interface circuitry, as dictated by the elements to which the computer is interfaced. For instance, if the computer were to interface directly to a vehicle bus, it would be necessary for the computer to have an output interface capable of writing data to the bus at the appropriate times and in the appropriate format. Bus interface circuitry is generally known in the art. An example would be an RS-232 translator associated with a personal computer serial port. If the computer were to communicate directly with the electronics control module, it would be provided with interface circuitry such as necessary to effect a uni- or bi-directional communications link with the module. Likewise, if the computer were to communicate directly to the monitoring system, the interface circuitry for the computer would be configured as appropriate.

Computer embodiments of the cal element can provide functionality beyond simply commanding the initiation of one or more calibration procedures. For instance, the cal element may be provided with the ability to command the resetting of one or more thresholds associated with the receiver, the thresholds defining the circumstances under which it is determined that an obstacle is present in the aperture environment. The cal element can also command the initiation of other calibration procedures in the monitoring system, can redefine the characteristics of the historical averaging used in dynamically adjusting the monitoring system to changes in the aperture environment over time, etc. Further still, the cal element may be provided with the capacity to receive certain information relating to the performance of the respective monitoring system, including calibration factors, ambient temperatures, etc.

The embodiments for the cal element which take the form of a computer, and even those simpler embodiments which require physically interfacing the cal element to a vehicle data network, to an electronics control module, or to the monitoring system itself, may be more appropriate for use by authorized personnel such as vehicle dealer repair technicians or monitoring system repair technicians. This is principally due to potential difficulty in accessing the physical locations for interfacing the cal element to the system.

Figure 11F:
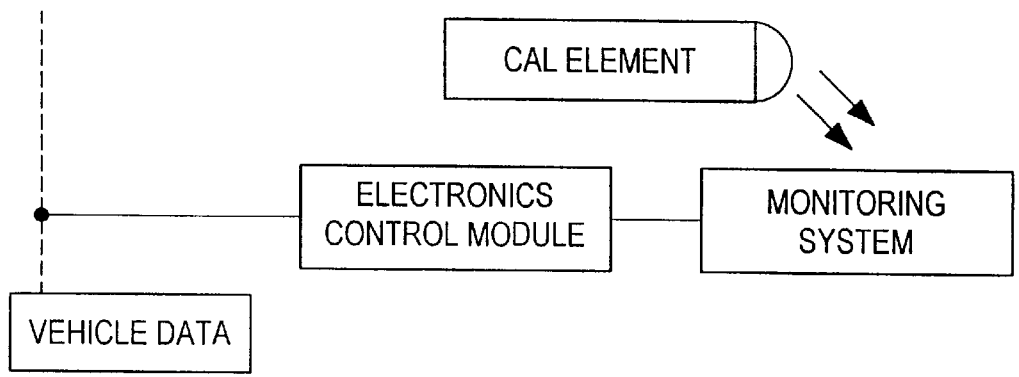

A simpler embodiment of a cal element which is ideally suited for use by a consumer or other unskilled user includes an IR transmitter programmed to emit a predetermined sequence of pulses when actuated by the user, either within or outside the vehicle (FIG. 11F). A corresponding monitoring system is provided with the ability to recognize receipt of this predetermined sequence of pulses as a command to initiate one or more calibration procedures. This monitoring system may always be checking for receipt of the coded sequence when powered, or may be provided with the ability to be placed into this receiving state, such as by activation of a predefined sequence of commands from an associated actuator such as a window control switch in a vehicle. This wireless embodiment of a cal element may further provide a higher level of monitoring system programmability by defining an appropriate communications protocol between the cal element and the monitoring system receiver and controller, thus making the wireless cal element suitable for use by both an end user as well as a factory repair technician.

The foregoing examples of the cal element have been described for use primarily with a vehicle aperture. However, these cal elements are equally applicable to aperture monitoring systems operating in non-vehicular settings.

These and other examples of the invention illustrated above are intended by way of example and the actual scope of the invention is to be limited solely by the scope and spirit of the following claims.

What is claimed is:

1. A method of improving the performance of a monitoring system associated with an aperture, said monitoring system comprising an emitter for emitting radiation adjacent said aperture and a receiver for receiving reflected radiation, said method comprising the steps of:

applying a material to a surface adjacent said aperture for altering the intensity of said emitted radiation as reflected from said surface, said material covering at least a portion of said surface;

emitting said radiation adjacent said aperture by said emitter;

receiving, by said receiver, at least a portion of said reflected radiation from said material; and comparing, by said monitoring system, said received radiation to a threshold value.

2. The method of claim 1, wherein said step of applying further comprises the step of applying a material for increasing said intensity of said reflected radiation at said receiver, and wherein said step of comparing further comprises determining whether said intensity of said received, reflected radiation is equal to or below said threshold value.

3. The method of claim 1, wherein said step of applying further comprises the step of applying a material for decreasing said intensity of said reflected radiation at said receiver, and wherein said step of comparing further comprises determining whether said intensity of said received, reflected radiation is equal to or above said threshold value.

4. The method of claim 1, wherein said step of applying further comprises the step of using a pressurized spray to apply said material to said surface.

5. The method of claim 1, wherein said step of applying further comprises the step of using an adhesive to apply said material to said surface.

6. A system for monitoring a space within or proximate to an aperture, said system comprising:

an emitter for emitting radiation adjacent said aperture;

a surface adjacent said aperture for reflecting a portion of said emitted radiation;

a material applied to said surface for altering an intensity of said reflected radiation;

a receiver adapted to receive at least a portion of said reflected radiation; and a processing element for determining if an intensity of said reflected radiation received by said receiver equals or exceeds a threshold level, wherein said material improves a signal-to-noise ratio of said receiver as compared to a monitoring system not comprising said material.

7. The system of claim 6, wherein said material increases said intensity of said reflected radiation.

8. The system of claim 7, wherein said material is selected from the group consisting of reflective tape, selectively embossed appliques, and an array of defractive optical reflectors.

9. The system of claim 6, wherein said material decreases said intensity of said reflected radiation.

10. The system of claim 9, wherein said material is selected from the group consisting of light absorbing paint, felt, and optical gratings.

11. The system of claim 6, wherein said material is deposited on said surface by a pressurized spray.

12. The system of claim 6, wherein said material has an adhesive backing for adhesion to said surface.

13. The system of claim 6, wherein said material is affixed to said surface by interference fit.

14. The system of claim 6, wherein said material comprises a plurality of features each having a radiation reflecting geometry.

15. The system of claim 14, wherein said features are embossed into said material.

16. The system of claim 6, wherein said material is an adhesive-backed tape.

17. A system for monitoring a space within or proximate to an aperture, said system comprising:

an emitter for emitting radiation adjacent said aperture;

a receiver adapted to receive said radiation as reflected from said space and to generate an output signal based upon said received radiation;

a reference source for providing a reference signal to said receiver; and a processing element for comparing said output signal to a threshold value.

18. The system of claim 17 wherein said emitter comprises at least one light emitting diode.

19. The system of claim 18 wherein said reference source comprises a light emitting diode.

20. The system of claim 19, wherein said at least one emitter light emitting diode and said reference source light emitting diode have substantially equivalent temperature-response characteristics.

21. The system of claim 17, wherein said reference source provides an electrical signal of known characteristics.

22. The system of claim 17, wherein said receiver further comprises a photodiode in communication with said processing element.

23. The system of claim 17, further comprising a memory element for storing data correlating a drive signal value required for said reference source and a gain signal value required for said receiver to result in a desired value for said output signal.

24. The system of claim 17, further comprising a memory element for storing data correlating a drive signal value required for said reference source and a drive signal value required for said emitter to result in a desired value for said output signal.

25. The system of claim 17, further comprising a temperature sensor for detecting the environmental temperature for said emitter and said reference source and for providing an output utilized in adjusting at least one of a drive signal for said reference source and a drive signal for said emitter to compensate for said environmental temperature.

26. The system of claim 17, further comprising a temperature sensor for detecting the environmental temperature for said receiver and for providing an output utilized in adjusting a gain control for said receiver to compensate for said environmental temperature.

27. The system of claim 17, wherein said emitter and said reference source have substantially the same temperature response characteristic, and wherein said receiver has an inverse temperature response characteristic relative to that of said emitter and said reference source.

28. A method of monitoring a space adjacent to or within an aperture comprising the steps of:
generating first reference radiation by applying a first reference drive signal to a reference emitter;
receiving said reference radiation by a receiver;
generating a first receiver output signal based upon said received reference radiation;
adjusting said first reference drive signal until a desired value for said output signal is generated by said receiver;
generating measurement radiation by applying a first measurement drive signal, based upon said first reference drive signal, to a measurement emitter;
receiving reflected measurement radiation by said receiver; and
generating a second receiver output signal based upon said received, reflected, measurement radiation.

29. The method of claim 28, further comprising the step of comparing said second output signal to a threshold value.

30. The method of claim 28, further comprising the steps of:
generating second reference radiation by applying a second reference drive signal to said reference emitter;
receiving said second reference radiation by said receiver;
setting a receiver gain level;
generating a third receiver output signal based upon said second reference radiation and said receiver gain level; and
recording said receiver gain level and said third receiver output signal.

31. The method of claim 30, further comprising the steps of:
changing said receiver gain level and repeating said steps of
generating said third receiver output signal based upon said second reference radiation and said receiver gain level, and
recording said receiver gain level and said third receiver output signal.

32. The method of claim 28, further comprising the steps of:
generating third reference radiation by applying a third reference drive signal to said reference emitter;
receiving said reference radiation by said receiver;
generating from said receiver a third output signal based upon said received reference radiation;
generating measurement radiation by applying a second measurement drive signal to said measurement emitter which is substantially equal to said third reference drive signal;
receiving reflected measurement radiation by said receiver;
generating a fourth output signal based upon said received, reflected, measurement radiation;
adjusting said second measurement drive signal until said fourth output signal substantially equals said third output signal; and
recording said adjustment in said second measurement drive signal.

33. The method of claim 28, further comprising the steps of:
obtaining an indication of the operating temperature for the environment of said reference and measurement emitters; and
adjusting said first reference drive signal based upon said indication.

34. The method of claim 28, further comprising the steps of:
obtaining an indication of the operating temperature for the environment of said receiver; and
adjusting said a gain control for said receiver based upon said indication.

35. The method of claim 28, further comprising the steps of:
selecting said reference emitter and said measurement emitter to have substantially similar temperature response characteristics; and
selecting said receiver to have an inverse temperature response to that of said reference emitter and said measurement emitter.

36. A system for monitoring a space adjacent to or within an aperture, comprising:
an emitter for emitting radiation adjacent said aperture;
a receiver adapted to receive said radiation as reflected from said space;
a processing element for determining if an intensity of said reflected radiation received by said receiver equals or exceeds a threshold level; and
a calibrating element for calibrating said system based upon said intensity of said reflected radiation.

37. The system of claim 36, wherein said processing element is communicable via a data network, and said calibrating element further comprises a data network interface for communicating with said processing element via said data network.

38. The system of claim 37, wherein said calibrating element is adapted for communicating directly with said processing element via said data network.

39. The system of claim 37, wherein said calibrating element is adapted for communicating indirectly with said processing element via said data network and at least one other device communicating over said data network.

40. The system of claim 37, wherein said calibrating element further comprises a portable computer.

41. The system of claim 36, wherein said calibrating element further comprises a mechanical signaling device in communication with said processing element.

42. The system of claim 36, wherein said calibrating element further comprises a calibration emitter for emitting a predetermined radiation pattern for receipt by said receiver.

43. The system of claim 42, wherein said processing element is adapted to adjust characteristics of said emitter and/or said receiver based upon said receipt of said predetermined recognition pattern by said receiver.

44. The system of claim 36, wherein said calibrating comprises adjusting characteristics of said emitter and/or receiver in response to said intensity of said reflected radiation.

45. The system of claim 36, wherein said calibration element is further adapted for calibrating said system only under predefined aperture environmental conditions.

46. A method of calibrating a system for monitoring a space adjacent to or within an aperture, said system comprising an emitter for emitting a radiation field adjacent said aperture, a receiver for receiving at least a reflected portion of said radiation field and for generating an output signal indicative of an intensity of said reflected radiation field, and a processing element for comparing said output signal with a threshold value, said method comprising the steps of:
providing a calibration signal to said processing element;
emitting said radiation field by said emitter;
receiving said reflected portion of said radiation field by said receiver and generating said output signal; and
adjusting, by said processing element, characteristics of said emitter and/or said receiver in response to said output signal.

47. The method of claim 46, wherein said step of providing further comprises interfacing a calibration signal generator to a data network to which said processing element is connected.

48. The method of claim 47, wherein said step of interfacing further comprises interfacing a portable computer to said data network to which said processing element is connected.

49. The method of claim 46, wherein said step of providing further comprises manipulating a mechanical interface to said processing element for generating said calibration signal.

50. The method of claim 46, wherein said step of providing further comprises generating a predetermined radiation signal by a calibration element for receipt by said receiver and for generation of said calibration signal by said receiver in response thereto.

51. The method of claim 50, wherein said step of generating further comprises activating a portable source of radiation compatible with said receiver for said generation of said predetermined radiation signal.

52. The method of claim 46, further comprising the step of waiting for a predefined set of aperture environmental conditions prior to performing said steps of emitting, receiving and adjusting.

53. A system for monitoring a space within or proximate to an aperture, comprising:
an emitter for emitting radiation adjacent said aperture;
a receiver for receiving said radiation as reflected from said space and for generating an output signal based upon said received radiation; and
a processing element for calculating a difference between said output signal and a first threshold value and for controlling one or both of said emitter and said receiver based upon said calculated difference.

54. The system of claim 53, further comprising a reference source for providing a reference signal to said receiver.

55. The system of claim 53, wherein said emitter is further for emitting said radiation in response to an applied drive control signal, and wherein said receiver is further for generating said output signal in response to an applied gain control signal.

56. The system of claim 53, wherein said processing element is further for controlling based upon said calculated difference and based upon a calculated difference from at least one prior use of said monitoring system.

57. The system of claim 56, wherein said at least one prior use of said monitoring system is defined by at least one condition associated with said aperture environment.

58. The system of claim 53, wherein said processing element is further for controlling one or both of said emitter and said receiver to alter said calculated difference by a desired percentage of said calculated difference.

59. The system of claim 53, wherein said processing element is further for controlling based upon an average difference based upon said calculated difference for the present use of said monitoring system and x prior use(s) of said monitoring system, where x is an integer greater than zero.

60. The system of claim 59, wherein said processing element is further for controlling one or both of said emitter and said receiver to alter said average calculated difference by a desired percentage of said calculated difference.

61. The system of claim 60, wherein said processing element is further for controlling one or both of said emitter and said receiver to alter said average calculated difference by a desired percentage of said calculated difference, wherein said percentage is determined by said processing element based upon a rate of change of said calculated difference for said present use of said monitoring system and x prior use(s) of said monitoring system.

62. The system of claim 53, wherein said processing element is further for controlling one or both of said emitter and said receiver if said calculated difference exceeds a second threshold.

63. The system of claim 62, wherein said processing system is further for controlling one or both of said emitter and said receiver if said calculated difference for said present use of said monitoring system and x out of y prior uses of said monitoring system exceeds said second threshold, wherein x is an integer greater than zero, and y is an integer greater than or equal to x.

64. A method of monitoring a spatial volume proximate an aperture, said method comprising the steps of:
emitting radiation adjacent said aperture;
receiving a portion of said radiation reflected from a surface in said aperture environment;
generating an output signal based upon said received radiation;
calculating a difference between said output signal and a first threshold value; and
controlling one or both of said emitting and said generating steps based upon said calculated difference to effect said calculated difference.

65. The method of claim 64, wherein said step of emitting further comprises emitting said radiation in response to a drive signal, and wherein said step of generating said output signal further comprises generating said output signal in response to an applied gain control signal.

66. The method of claim 64, wherein said step of controlling further comprises controlling one or both of said emitting and said generating steps based upon said calculated difference and a calculated difference from at least one prior use of said method.

67. The method of claim 66, wherein said at least one prior use of said controlling step is defined by at least one condition associated with said aperture environment.

68. The method of claim 64, wherein said step of controlling further comprises controlling one or both of said emitting and said generating steps to alter said calculated difference by a desired percentage of said calculated difference.

69. The method of claim 64, wherein said step of controlling further comprises controlling one or both of said emitting and said generating steps based upon an average difference from said calculated difference and a calculated difference from x prior use(s) of said method, where x is an integer greater than zero.

70. The method of claim 69, wherein said step of controlling further comprises controlling one or both of said emitting and generating steps to alter said average difference by a desired percentage of said average difference.

71. The method of claim 70, wherein said step of controlling further comprises controlling one or both of said emitting and generating steps to alter said average difference by a desired percentage of said average difference, wherein said percentage is based upon a rate of change of said calculated difference for said present use of said method and x prior use(s) of said method.

72. The method of claim 64, wherein said step of controlling further comprises controlling one or both of said emitting and generating steps if said calculated difference exceeds a second threshold value.

73. The method of claim 72, wherein said step of controlling further comprises controlling one or both of said emitting and generating steps if said calculated difference for the present use of said method and x out of y prior uses of said monitoring system exceeds said second threshold, wherein x is an integer greater than zero and y is an integer greater than or equal to x.

* * * * *